US012519250B2

(12) United States Patent
Li et al.

(10) Patent No.: US 12,519,250 B2
(45) Date of Patent: Jan. 6, 2026

(54) CROSS-DIPOLE RADIATING ELEMENTS HAVING FREQUENCY SELECTIVE SURFACES AND BASE STATION ANTENNAS HAVING SUCH RADIATING ELEMENTS

(71) Applicant: Outdoor Wireless Networks LLC, Claremont, NC (US)

(72) Inventors: Haifeng Li, Allen, TX (US); Peter J. Bisiules, LaGrange Park, IL (US)

(73) Assignee: Outdoor Wireless Networks LLC, Richardson, TX (US)

( * ) Notice: Subject to any disclaimer, the term of this patent is extended or adjusted under 35 U.S.C. 154(b) by 152 days.

(21) Appl. No.: 18/339,317

(22) Filed: Jun. 22, 2023

(65) Prior Publication Data

US 2024/0006777 A1 Jan. 4, 2024

Related U.S. Application Data

(60) Provisional application No. 63/357,698, filed on Jul. 1, 2022.

(51) Int. Cl.
*H01Q 21/24* (2006.01)
*H01Q 1/24* (2006.01)
(Continued)

(52) U.S. Cl.
CPC ............. *H01Q 21/24* (2013.01); *H01Q 1/246* (2013.01); *H01Q 1/523* (2013.01); *H01Q 5/48* (2015.01);
(Continued)

(58) Field of Classification Search
CPC .......... H01Q 21/24; H01Q 1/246; H01Q 9/16; H01Q 19/108; H01Q 1/523; H01Q 21/062; H01Q 5/48
See application file for complete search history.

(56) References Cited

U.S. PATENT DOCUMENTS 7,839,351 B2 * 11/2010 Schadler ................ H01Q 21/26 343/890
2015/0084823 A1 * 3/2015 Wang ................... H01Q 25/001 343/797
(Continued)

FOREIGN PATENT DOCUMENTS

WO 2021042862 A1 3/2021

OTHER PUBLICATIONS

"International Search Report and Written Opinion in Corresponding Application No. PCTUS2325387, mailed Sep. 22, 2023, 19 pages".

*Primary Examiner* — Hai V Tran
(74) *Attorney, Agent, or Firm* — Myers Bigel, P.A.

(57) ABSTRACT

Antennas include a first radiating element that is configured to operate in a first operating frequency band, and a second radiating element that is configured to operate in a second operating frequency band that encompasses higher frequencies than the first operating frequency band. The first radiating element includes a first dipole radiator having first and second dipole arms and a second dipole radiator having third and fourth dipole arms. The first dipole arm includes a first metal region that substantially surrounds a first non-metal interior region, and the first non-metal interior region is configured so that currents induced on a first portion of the first metal region by RF energy emitted by the second radiating element substantially cancel currents induced on a second portion of the first metal region by the RF energy emitted by the second radiating element.

19 Claims, 10 Drawing Sheets

(51) Int. Cl.

| | |
|---|---|
| ***H01Q 1/52*** | (2006.01) |
| ***H01Q 5/48*** | (2015.01) |
| ***H01Q 9/16*** | (2006.01) |
| ***H01Q 19/10*** | (2006.01) |
| ***H01Q 21/06*** | (2006.01) |

(52) U.S. Cl.
CPC ............. *H01Q 9/16* (2013.01); *H01Q 19/108* (2013.01); *H01Q 21/062* (2013.01)

(56) References Cited

U.S. PATENT DOCUMENTS

| | | | | |
|---|---|---|---|---|
| 2018/0358692 | A1 | 12/2018 | Semonov et al. | |
| 2020/0328533 | A1* | 10/2020 | Sundararajan ......... | H01Q 1/246 |
| 2020/0373668 | A1* | 11/2020 | Wu ........................ | H01Q 9/285 |
| 2021/0359414 | A1* | 11/2021 | Sundararajan ......... | H01Q 1/521 |
| 2022/0077599 | A1 | 3/2022 | Li et al. | |
| 2022/0077600 | A1 | 3/2022 | Sundararajan et al. | |

* cited by examiner

CROSS-DIPOLE RADIATING ELEMENTS HAVING FREQUENCY SELECTIVE SURFACES AND BASE STATION ANTENNAS HAVING SUCH RADIATING ELEMENTS

CROSS-REFERENCE TO RELATED APPLICATION

The present application claims priority under 35 U.S.C. § 119 to U.S. Provisional Application Ser. No. 63/357,698, filed Jul. 1, 2022, the entire content of which is incorporated herein by reference as if set forth in its entirety.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers that are within the cell served by the base station. Typically, the base station antennas are mounted on a tower or other raised structure, with the radiation patterns (also referred to herein as "antenna beams") that are generated by the base station antennas directed outwardly. In many cases, each base station is divided into "sectors." In one common configuration, a hexagonally shaped cell is divided into three 120° sectors in the azimuth plane, and each sector is served by one or more base station antennas that generate antenna beams having azimuth Half Power Beamwidths ("HPBW") of approximately 65', which provides good coverage throughout the 120° sector. Base station antennas that provide less than omnidirectional (360°) coverage in the azimuth plane are often referred to as "sector" base station antennas. The antenna beams formed by both omnidirectional and sector base station antennas are typically generated by linear or planar phased arrays of radiating elements that are included in the antenna.

In order to accommodate the increasing volume of cellular communications, cellular operators have added cellular service in a variety of new frequency bands. While in some cases it is possible to use a single array of so-called "wide band" or "ultra-wide-band" radiating elements to provide service in multiple frequency bands, in other cases it is necessary to use different arrays of radiating elements to support service in the different frequency bands.

As the number of frequency bands has proliferated, and increased sectorization has become more common (e.g., dividing a cell into six, nine or even twelve sectors), the number of base station antennas deployed at a typical base station has increased significantly. However, due to, for example, local zoning ordinances and/or weight and wind loading constraints for the antenna towers, there is often a limit as to the number of base station antennas that can be deployed at a given base station. In order to increase capacity without further increasing the number of base station antennas, so-called multi-band base station antennas have been introduced which include multiple arrays of radiating elements. Multi-band base station antennas are now being developed that include arrays that operate in three (or more) different frequency bands and often within multiple sub-bands in one or more of these frequency bands. For example, base station antennas are now being deployed that include two linear arrays of "low-band" radiating elements that operate in some or all of the 694-960 MHz frequency band, two linear arrays of "mid-band" radiating elements that operate in some or all of the 1427-2690 MHz frequency band and one or more multi-column (planar) arrays of "high-band" radiating elements that operate in some or all of a higher frequency band, such as the 3.3-4.2 GHz frequency band. Unfortunately, the different arrays can interact with each other, which may make it challenging to implement such a multi-band antenna while also meeting customer requirements relating to the size (and particularly the width) of the base station antenna.

SUMMARY

Pursuant to embodiments of the present invention, antennas (e.g., base station antennas) are provided that comprise a reflector, a first radiating element extending forwardly from the reflector that is configured to operate in a first operating frequency band, and a second radiating element extending forwardly from the reflector that is configured to operate in a second operating frequency band that encompasses higher frequencies than the first operating frequency band. The first radiating element includes a first dipole radiator having a first dipole arm and a second dipole arm and a second dipole radiator having a third dipole arm and a fourth dipole arm. The first dipole arm includes a first metal region that substantially surrounds a first non-metal interior region, and the first non-metal interior region is configured so that currents induced on a first portion of the first metal region by RF energy emitted by the second radiating element substantially cancel currents induced on a second portion of the first metal region by the RF energy emitted by the second radiating element.

In some embodiments, the first metal region may be a closed loop that completely surrounds the first non-metal interior region.

In some embodiments, the first non-metal interior region may comprise first and second slots in the first metal region where metal is omitted, and a longitudinal axis of the first slot may intersect a longitudinal axis of the second slot at an angle of 90°.

In some embodiments, the first radiating element may be a dual polarized radiating element that is configured to transmit and receive RF energy at respective first and second orthogonal linear polarizations, and the first slot may extend in a direction of the first linear polarization and the second slot may extend in a direction of the second linear polarization.

In some embodiments, the second dipole arm may comprise a second metal region that substantially surrounds a second non-metal interior region, and the second non-metal interior region may be configured so that currents induced on a first portion of the second metal region by RF energy emitted by the second radiating element substantially cancel currents induced on a second portion of the second metal region by the RF energy emitted by the second radiating element. In some embodiments, the second non-metal interior opening may comprise third and fourth slots in the second metal region where metal is omitted, and a longitudinal axis of the third slot may intersect a longitudinal axis of the fourth slot at an angle of 90°. In some embodiments, the first slot and the third slot may be collinear. In some embodiments, the second slot and the fourth slot may extend in parallel to each other.

In some embodiments, the first non-metal interior region may comprise a central opening and first and second auxiliary openings that extend outwardly from the central opening. In some embodiments, the first and second auxiliary openings may comprise first and second collinear segments of a first slot that extends through the central opening. In some embodiments, the central opening further may include third and fourth auxiliary openings that extend outwardly from the central region, the third and fourth auxiliary openings may be third and fourth collinear segments of a second slot that extends through the central opening. In some embodiments, the first slot may intersect the second slot at an angle of 90°.

In some embodiments, the first dipole arm may have a square outer perimeter, and the first and second slots may extend along the respective diagonals of the square outer perimeter.

In some embodiments, the first non-metal interior region may be a central opening and a plurality of auxiliary openings that extend radially outwardly from the central opening. In some embodiments, the plurality of auxiliary openings may comprise a first slot that includes first and second segments that are collinear and that extend radially from the central opening and a second slot that includes third and fourth segments that are collinear and that extend radially from the central opening. In some embodiments, the first through fourth segments may define a cross shape. In some embodiments, the plurality of auxiliary openings may further comprise a plurality of satellite openings, and a distal end of each of the first through fourth segments may terminate into a corresponding one of the satellite openings. In some embodiments, a width of each of the first through fourth segments is less than a width of the corresponding one of the satellite openings. In some embodiments, each satellite opening may be a rectangular opening.

In some embodiments, the first metal region may be a piece of sheet metal and the first non-metal interior region may be an opening stamped into the piece of sheet metal.

In some embodiments, each of the first through fourth dipole arms may have a substantially rectangular perimeter except for first and second recesses that are on respective first and second sides of the substantially rectangular perimeter. In some embodiments, the first recess on the first dipole arm may face the first recess on the second dipole arm and the second recess on the first dipole arm may face the second recess on the fourth dipole arm.

In some embodiments, the first through fourth dipole arms may each have a base that is adjacent a feed structure for the first radiating element and a distal end that is opposite the base. In some embodiments, the first radiating element may further comprise at least one feed stalk that extends generally perpendicular to a plane defined by the radially-extending slots.

In some embodiments, the first through fourth dipole arms may be configured to be substantially transparent to RF signals in the second operating frequency band.

In some embodiments, a shape of the first non-metal interior region may be configured to make the first metal region act as a frequency selective surface that conducts currents excited in response to RF energy in the first operating frequency band while cancelling currents excited in response to RF energy in the second operating frequency band.

Pursuant to further embodiments of the present invention, antennas are provided that comprise a reflector, a first radiating element extending forwardly from the reflector that is configured to operate in a first operating frequency band, and a second radiating element extending forwardly from the reflector that is configured to operate in a second operating frequency band that encompasses higher frequencies than the first operating frequency band. The first radiating element includes a first dipole radiator having a first dipole arm and a second dipole arm and a second dipole radiator having a third dipole arm and a fourth dipole arm and the first dipole arm comprises a first metal region that substantially surrounds a non-metal interior region, and a shape of the non-metal interior region is configured to make the first metal region act as a frequency selective surface that conducts currents excited in response to RF energy in the first operating frequency band while cancelling currents excited in response to RF energy in the second operating frequency band.

In some embodiments, the first metal region may be a closed loop that completely surrounds the first non-metal interior region.

In some embodiments, the first non-metal interior region may comprise first and second slots in the first metal region where metal is omitted, and a longitudinal axis of the first slot intersects a longitudinal axis of the second slot at an angle of 90°. In some embodiments, the first radiating element may be a dual polarized radiating element that is configured to transmit and receive RF energy at respective first and second orthogonal linear polarizations, and the first slot may extend in a direction of the first linear polarization and the second slot may extend in a direction of the second linear polarization. In some embodiments, the second dipole arm may comprise a second metal region that substantially surrounds a second non-metal interior region, and the second non-metal interior region may be configured so that currents induced on a first portion of the second metal region by RF energy emitted by the second radiating element substantially cancel currents induced on a second portion of the second metal region by the RF energy emitted by the second radiating element. In some embodiments, the second non-metal interior opening may comprise third and fourth slots in the second metal region where metal is omitted, and a longitudinal axis of the third slot may intersect a longitudinal axis of the fourth slot at an angle of 90°. In some embodiments, the first slot and the third slot may be collinear, and the second slot and the fourth slot may extend in parallel to each other.

In some embodiments, the first non-metal interior region may comprise a central opening and a plurality of auxiliary openings that extend radially outwardly from the central opening. In some embodiments, the plurality of auxiliary openings may comprise a first slot that includes first and second segments that are collinear and that extend radially from the central opening and a second slot that includes third and fourth segments that are collinear and that extend radially from the central opening. In some embodiments, the first through fourth segments may define a cross shape. In some embodiments, the plurality of auxiliary openings may further comprise a plurality of satellite openings, and a distal end of each of the first through fourth segments may terminate into a corresponding one of the satellite openings, and a width of each of the first through fourth segments may be less than a width of the corresponding one of the satellite openings. In some embodiments, each satellite opening may be a rectangular opening.

In some embodiments, each of the first through fourth dipole arms may have a substantially rectangular perimeter except for first and second recesses that are on respective first and second sides of the substantially rectangular perimeter. In some embodiments, the first recess on the first dipole arm may face the first recess on the second dipole arm and the second recess on the first dipole arm may face the second recess on the fourth dipole arm.

Pursuant to still further embodiments of the present invention, antennas are provided that comprise a reflector, a first radiating element extending forwardly from the reflector that is configured to operate in a first operating frequency band, and a second radiating element extending forwardly from the reflector that is configured to operate in a second operating frequency band that encompasses higher frequencies than the first operating frequency band. The first radiating element includes a first dipole radiator having a first dipole arm and a second dipole arm and a second dipole radiator having a third dipole arm and a fourth dipole arm. The first dipole arm comprises a first metal region that substantially surrounds a first non-metal interior region that comprises a central opening and first and second auxiliary openings that extend radially from the central opening.

In some embodiments, the first metal region is a closed loop that completely surrounds the first non-metal interior region.

In some embodiments, the first and second auxiliary openings may be first and second collinear segments of a first slot that extends through the central opening.

In some embodiments, the central opening may further include third and fourth auxiliary openings that extend outwardly from the central opening, the third and fourth auxiliary openings comprising third and fourth collinear segments of a second slot that extends through the central opening, wherein the first slot intersects the second slot at an angle of 90°.

In some embodiments, the first dipole arm may have a substantially square outer perimeter, and the first and second slots may extend along the respective diagonals of the square outer perimeter.

In some embodiments, the first radiating element may be a dual polarized radiating element that is configured to transmit and receive RF energy at respective first and second orthogonal linear polarizations, and the first slot may extend in a direction of the first linear polarization and the second slot may extend in a direction of the second linear polarization.

In some embodiments, the second dipole arm may comprise a second metal region that substantially surrounds a second non-metal interior region, and the second non-metal interior region nay be configured so that currents induced on a first portion of the second metal region by RF energy emitted by the second radiating element substantially cancel currents induced on a second portion of the second metal region by the RF energy emitted by the second radiating element, and the second non-metal interior opening may comprise third and fourth slots in the second metal region where metal is omitted, and a longitudinal axis of the third slot may intersect a longitudinal axis of the fourth slot at an angle of 90°.

In some embodiments, the first slot and the third slot may be collinear, and/or the second slot and the fourth slot may extend in parallel to each other.

In some embodiments, each of the first through fourth dipole arms may have a substantially rectangular perimeter except for first and second recesses that are on respective first and second sides of the substantially rectangular perimeter. In some embodiments, the first recess on the first dipole arm may face the first recess on the second dipole arm and the second recess on the first dipole arm may face the second recess on the fourth dipole arm.

Pursuant to additional embodiments of the present invention, antennas are provided that, comprise a reflector, a first radiating element extending forwardly from the reflector that is configured to operate in a first operating frequency band, and a second radiating element extending forwardly from the reflector that is configured to operate in a second operating frequency band that encompasses higher frequencies than the first operating frequency band. The first radiating element includes a first dipole radiator having a first dipole arm and a second dipole arm and a second dipole radiator having a third dipole arm and a fourth dipole arm. The first dipole arm comprises a first metal sheet having a first interior opening that comprises a first slot and a second slot that intersects the first slot at an angle of 90°.

In some embodiments, a perimeter of the first metal sheet completely surrounds the interior opening.

In some embodiments, the first radiating element is a dual polarized radiating element that is configured to transmit and receive RF energy at respective first and second orthogonal linear polarizations, and the first slot extends in a direction of the first linear polarization and the second slot extends in a direction of the second linear polarization.

In some embodiments, the second dipole arm comprises a second metal sheet that substantially surrounds a second interior opening, and the second interior opening is configured so that currents induced on a first portion of the second metal sheet by RF energy emitted by the second radiating element substantially cancel currents induced on a second portion of the second metal sheet by the RF energy emitted by the second radiating element, the second interior opening comprises third and fourth slots in the second metal region where metal is omitted, and a longitudinal axis of the third slot intersects a longitudinal axis of the fourth slot at an angle of 90°.

In some embodiments, the first slot and the third slot are collinear, and wherein the second slot and the fourth slot extend in parallel to each other.

In some embodiments, the first interior opening comprises a central opening, the first slot comprise first and second collinear segments that extend radially from the central opening, the second slot comprises third and fourth collinear segments that extend radially from the central opening, and a plurality of satellite openings, wherein a distal end of each of the first through fourth segments terminates into a corresponding one of the satellite openings, and a width of each of the first through fourth segments is less than a width of the corresponding one of the satellite openings.

In some embodiments, the first dipole arm has a substantially square outer perimeter, and the first and second slots extend along the respective diagonals of the square outer perimeter.

BRIEF DESCRIPTION OF THE DRAWINGS

FIG. 58 is a front view of the low-band radiating element of FIGS. 4A-48 that shows the current distribution on the dipole radiators in response to radiation emitted by a −45°) dipole radiator of a near-by mid-band radiating element.

DETAILED DESCRIPTION

Figure 1:
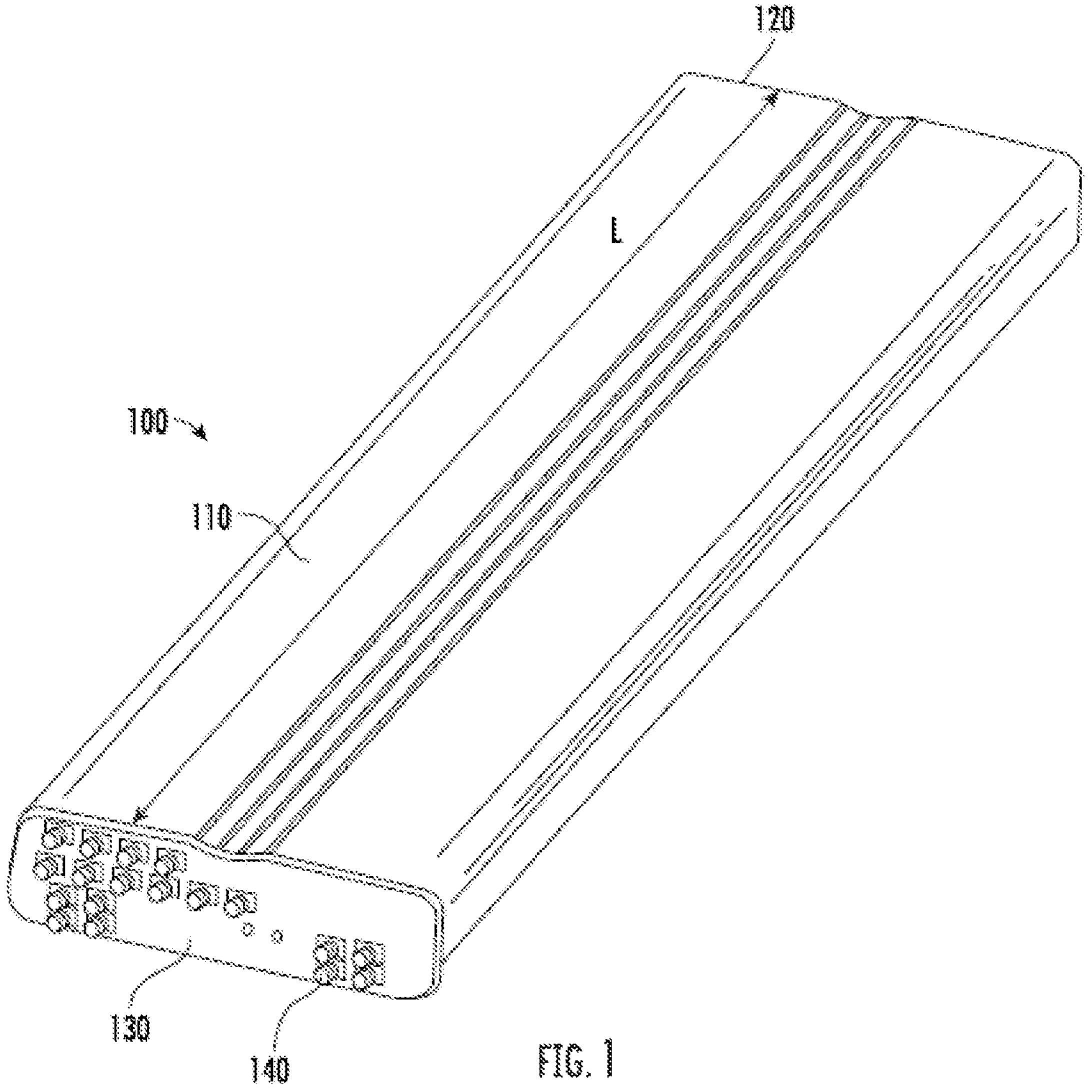
FIG. 1 is a perspective view of a base station antenna according to embodiments of the present invention.

Embodiments of the present invention relate generally to radiating elements for multi-band base station antennas and to related base station antennas. The base station antennas that include radiating elements according to embodiments of the present invention may be used, for example, as sector antennas in the above-described cellular communications systems. The multi-band base station antennas according to embodiments of the present invention may support multiple major air-interface standards in two or more cellular frequency bands and allow wireless operators to reduce the number of antennas deployed at base stations, lowering tower leasing costs.

A challenge in the design of multi-band base station antennas is reducing the effect of scattering of the RF signals at one frequency band by the radiating elements of other frequency bands. Scattering is undesirable as it may affect the shape of the antenna beam in both the azimuth and elevation planes, and the effects may vary significantly with frequency, which may make it hard to compensate for these effects. Moreover, at least in the azimuth plane, scattering tends to impact the beamwidth, beam shape, pointing angle, gain and front-to-back ratio of the antenna beams in undesirable ways. The radiating elements according to embodiments of the present invention are so-called "cloaking" radiating elements that have reduced impact on the antenna beams generated by closely located radiating elements that transmit and receive signals in other frequency bands (i.e., reduced scattering).

Cloaking low-band radiating elements are known in the art. For example, U.S. Pat. No. 9,570,804 discloses a low-band radiating element that operates in the 696-960 MHz frequency band that includes dipole arms that are formed as a series of RF chokes in order to render the low-band radiating element substantially transparent to RF energy in the 1.7-2.7 GHz frequency band. U.S. Pat. Nos. 10,439,285 and 10,770,803 each disclose low-band radiating elements that operate in the 696-960 MHz frequency band that include dipole arms that are formed as a series of widened segments that are coupled by narrow inductive segments, which may be implemented as small, meandered trace segments on a printed circuit board. In each case, the narrow inductive segments act as high impedance elements for RF energy in the 1.7-2.7 GHz frequency band, rendering the low-band radiating elements substantially transparent to RF energy in that frequency range. As another example, U.S. Pat. No. 11,018,437 discloses a low-band radiating element that operates in the 696-960 MHz frequency band that includes two dipole arms that are substantially transparent to RF energy in the 1.7-2.7 GHz frequency band and another two dipole arms that are substantially transparent to RF energy in the 3.3-4.2 GHz frequency band. Additional cloaking radiating element designs are disclosed in Chinese Patent No. CN 112787061A, Chinese Patent No. CN 112164869A, Chinese Patent No. CN 112290199A, Chinese Patent No. CN 111555030A, Chinese Patent No. CN 112186333A, Chinese Patent No. CN 112186341A, Chinese Patent No. CN 112768895A, Chinese Patent No. CN 112821044A, Chinese Patent No. CN 213304351U, Chinese Patent No. CN 112421219A, and PCT Publication WO 2021/042862.

Pursuant to embodiments of the present invention, multi-band base station antennas are provided that include at least an array of first radiating elements and an array of second radiating elements that transmit and receive signals in respective first and second (different) frequency bands. In some embodiments, the multi-band base station antennas may further include an array of third radiating elements that transmits and receives signals in a third frequency band that differs from the first and second frequency bands. In some embodiments, the first frequency band may comprise the 617-960 MHz frequency band or a portion thereof, the second frequency band may comprise the 1427-2690 MHz frequency band or a portion thereof, and the third frequency band may comprise the 3100-4200 MHz frequency band or a portion thereof. Each first radiating element may be a cloaking radiating element that has dipole radiators that are substantially transparent to RE energy in the second frequency band. In some embodiments, each first radiating element may also be substantially transparent to RE energy in the third frequency band.

As discussed above, a number of different cloaking radiating elements are known in the art that are designed to be substantially transparent to RF energy emitted by nearby radiating elements that operate in different frequency bands. Many of these designs, however, have dipole arms that have integrated inductor-capacitor ("L-C") resonant circuits that form a filter that blocks currents in the operating frequency band of the nearby radiating elements. The inductors in these L-C circuits, however, can make it more difficult to impedance match the feed stalk of the decoupling radiating element to the dipole arms thereof. The cloaking radiating elements according to embodiments of the present invention use frequency selective surfaces that are configured to destructively cancel RE energy in the second frequency band while passing RF energy in the first frequency band. As a result, the cloaking, radiating dements according to embodiments of the present invention may have improved impedance matching between the feed stalk and the dipole arms, which allows the radiating elements to exhibit a wider operating bandwidth. Additionally, the cloaking radiating elements according to embodiments of the present invention may provide enhanced suppression of the higher band currents.

The cloaking radiating elements according to embodiments of the present invention may be cross-dipole radiating elements, such as −45°/+45° polarized cross-dipole radiating elements or horizontal/vertical polarized cross-dipole radiating elements. Each radiating element includes a pair of dipole radiators that radiate at orthogonal polarizations. Each dipole radiator may include a pair of center-fed dipole arms so that each radiating element includes a total of four dipole arms.

In some embodiments, each dipole arm may comprise a square piece of sheet metal that has an interior opening where the metal has been removed so that each dipole arm comprises a metal region that substantially or completely surrounds an associated non-metal interior region. The non-metal interior region may simply comprise an opening in the metal (i.e., it is air) or may be partially or completely filled with a non-metal material. The interior opening may be shaped so that the currents induced on one or more portions of the metal region by higher-band RF energy emitted by a nearby radiating element are substantially cancelled by currents induced on respective corresponding portions of the metal region by the higher-band RF energy. The shape of the interior opening is also configured so that currents induced on the metal region in response to RF energy in the operating frequency band of the radiating element will flow on the dipole arms without significant cancellation in order to radiate RF energy along the desired polarization direction. Thus, each dipole arm may be viewed as a frequency selective surface that allows currents to flow in some frequency ranges and that substantially suppresses current flow in other frequency bands.

The antennas according to some embodiments of the present invention may include a reflector, a first radiating element extending forwardly from the reflector that is configured to operate in a first operating frequency band, and a second radiating element extending forwardly from the reflector that is configured to operate in a second operating frequency band that encompasses higher frequencies than the first operating frequency band. The first radiating element includes a first dipole radiator having a first dipole arm and a second dipole arm and a second dipole radiator having a third dipole arm and a fourth dipole arm. The first dipole arm comprises a first metal region that substantially surrounds a first non-metal interior region, and the first non-metal interior region is configured so that currents induced on a first portion of the first metal region by RF energy emitted by the second radiating element substantially cancel currents induced on a second portion of the first metal region by the RF energy emitted by the second radiating element.

The antennas according to further embodiments of the present invention may include a reflector, a first radiating element extending forwardly from the reflector that is configured to operate in a first operating frequency band, and a second radiating element extending forwardly from the reflector that is configured to operate in a second operating frequency band that encompasses higher frequencies than the first operating frequency band. The first radiating element includes a first dipole radiator having a first dipole arm and a second dipole arm and a second dipole radiator having a third dipole arm and a fourth dipole arm. The first dipole arm comprises a first metal region that substantially surrounds a non-metal interior region, and a shape of the non-metal interior region is configured to make the first metal region act as a frequency selective surface that conducts currents excited in response to RF energy in the first operating frequency band while cancelling currents excited in response to RF energy in the second operating frequency band.

Antennas according to still further embodiments of the present invention may include a reflector, a first radiating element extending forwardly from the reflector that is configured to operate in a first operating frequency band, and a second radiating element extending forwardly from the reflector that is configured to operate in a second operating frequency band that encompasses higher frequencies than the first operating frequency band. The first radiating element includes a first dipole radiator having a first dipole arm and a second dipole arm and a second dipole radiator having a third dipole arm and a fourth dipole arm. The first dipole arm comprises a first metal region that substantially surrounds a first non-metal interior region that comprises a central opening and first and second auxiliary openings that extend outwardly from the central region.

Antennas according to additional embodiments of the present invention may include a reflector, a first radiating element extending forwardly from the reflector that is configured to operate in a first operating frequency band, and a second radiating element extending forwardly from the reflector that is configured to operate in a second operating frequency band that encompasses higher frequencies than the first operating frequency band. The first radiating element includes a first dipole radiator having a first dipole arm and a second dipole arm and a second dipole radiator having a third dipole arm and a fourth dipole arm. The first dipole arm comprises a first metal sheet having an interior opening that comprises a first slot and a second slot that intersects the first slot at an angle of 90°.

When the antennas according to embodiments of the present invention include arrays of radiating elements that operate in three different frequency bands, the radiating elements that operate in the lowest frequency band may be referred to as "low-band" radiating elements, the radiating elements that operate in the highest frequency band may be referred to as "high-band" radiating elements, and the radiating elements that operate in the intermediate frequency band may be referred to as "mid-band" radiating elements.

Embodiments of the present invention will now be described in further detail with reference to the attached figures.

Figure 2:
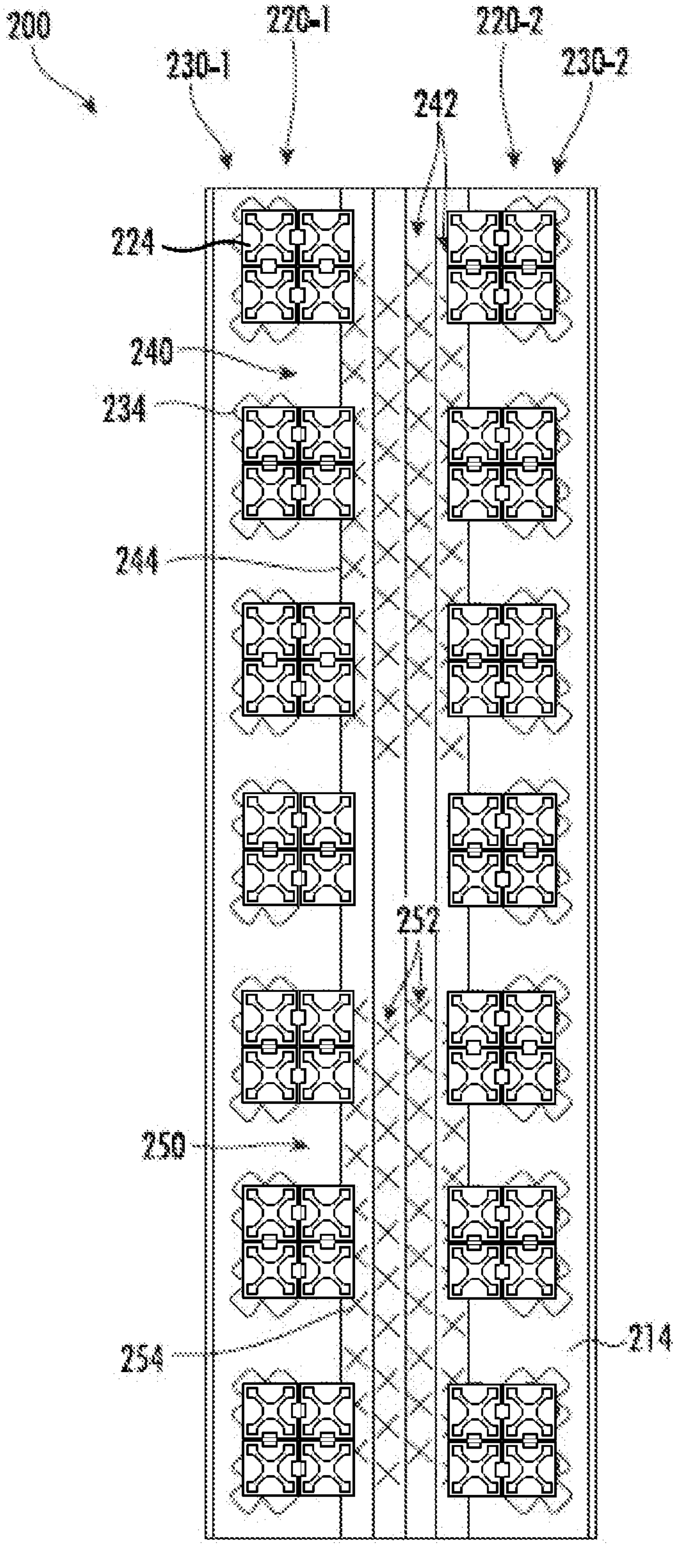
FIG. 2 is a front view of the base station antenna of FIG. 1 with the radome removed.
Figure 3:
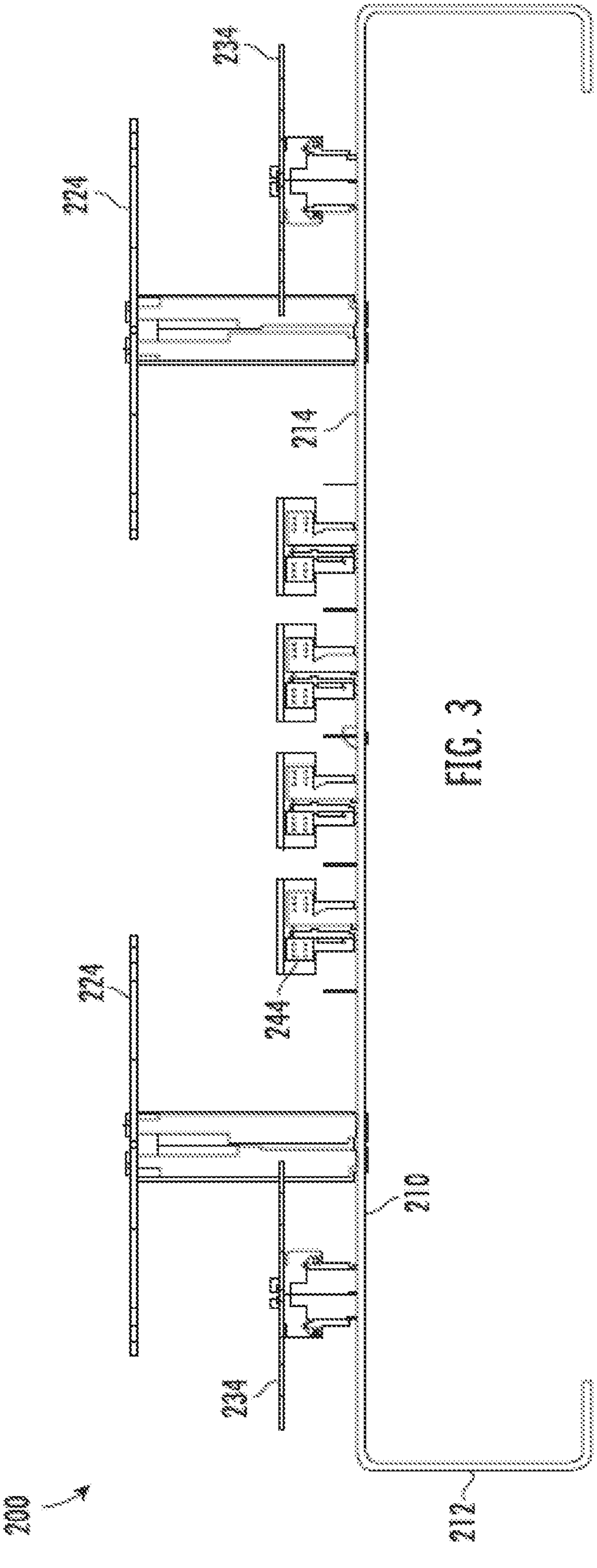
FIG. 3 is a cross-sectional view of the base station antenna of FIG. 1 with the radome removed.

FIGS. 1-3 illustrate a base station antenna 100 according to certain embodiments of the present invention. In particular, FIG. 1 is a perspective view of the antenna 100, while FIGS. 2 and 3 are a front view and a cross-sectional view, respectively, of the antenna 100 with the radome thereof removed to illustrate an antenna assembly 200 of the antenna 100. In the description that follows, the antenna 100 and the radiating elements included therein will be described using terms that assume that the antenna 100 is mounted for normal use on a tower with a longitudinal axis of the antenna 100 extending along a vertical axis and the front surface of the antenna 100 mounted opposite the tower pointing toward the coverage area for the antenna 100.

As shown in FIGS. 1-3, the base station antenna 100 is an elongated structure that extends along a longitudinal axis L. The base station antenna 100 may have a tubular shape with a generally rectangular cross-section. The antenna 100 includes a radome 110 and a top end cap 120. The antenna 100 also includes a bottom end cap 130 which includes a plurality of connectors 140 such as RF ports mounted therein. The antenna 100 is typically mounted in a vertical configuration (i.e., the longitudinal axis L may be generally perpendicular to a plane defined by the horizon) when the antenna 100 is mounted for normal operation. The radome 110, top cap 120 and bottom cap 130 may form an external housing for the antenna 100. An antenna assembly 200 is contained within the external housing. The antenna assembly 200 may be slidably inserted into the radome 110 from either the top or bottom before the top cap 120 or bottom cap 130 are attached to the radome 110.

FIGS. 2 and 3 are a front view and a cross-sectional view, respectively, of the antenna assembly 200 of base station antenna 100. As shown in FIGS. 2 and 3, the antenna assembly 200 includes a ground plane structure 210 that has sidewalls 212 and a reflector surface 214. Various mechanical and electronic components of the antenna (not shown) may be mounted in a chamber that is defined between the sidewalls 212 and the back side of the reflector surface 214 such as, for example, phase shifters, remote electronic tilt units, mechanical linkages, controllers, diplexers, and the like. The reflector surface 214 of the ground plane structure 210 may comprise or include a metallic surface (e.g., a sheet of aluminium) that serves as a reflector and ground plane for the radiating elements of the antenna 100. Herein the reflector surface 214 may also be referred to as the reflector 214.

A plurality of dual-polarized radiating elements are mounted to extend forwardly from the reflector 214. The radiating elements include low-band radiating elements 224, mid-band radiating elements 234 and high-band radiating elements 244, 254. The low-band radiating elements 224 are mounted in two columns to form two linear arrays 220-1, 220-2 of low-band radiating elements 224. The mid-band radiating elements 234 may likewise be mounted in two columns to form two linear arrays 230-1, 230-2 of mid-band radiating elements 234. Two planar arrays of high-band radiating elements 244, 254 are included in antenna 100. The first planar array 240 includes four columns 242 of high-band radiating elements 244. The second planar array 250 includes four columns 252 of high-band radiating elements 254. The high-band radiating elements 244 may be the same as or different from the high-band radiating elements 254. All four columns 242 of high-band radiating elements 244 may be coupled to ports of a first beamforming radio (not shown), so that the first planar array 240 may perform active beamforming to generate higher gain antenna beams. All four columns 252 of high-band radiating elements 254 may be coupled to ports of a second beamforming radio (not shown), so that the second planar array 250 may likewise perform active beamforming. Herein, the linear arrays 220-1, 220-2 of low-band radiating elements 224 may also be referred to as the low-band linear arrays 220-1, 220-2, the linear arrays 230-1, 230-2 of mid-band radiating elements 234 may also be referred to as the mid-band linear arrays 230-1, 230-2, and the arrays 240, 250 of high-band radiating elements 244, 254 may also be referred to as the high-band arrays 240, 250.

It will be appreciated that the number of arrays of low-band, mid-band and/or high-band radiating elements may be varied from what is shown in FIGS. 2 and 3, as may the number of columns and/or radiating elements in each array, and the relative positions of the arrays. It should be noted that herein like elements may be referred to individually by their full reference numeral (e.g., linear array 230-2) and may be referred to collectively by the first part of their reference numeral (e.g., the linear arrays 230).

In the depicted embodiment, the first and second planar arrays 240, 250 of high-band radiating elements 244, 254 are positioned between the linear arrays 220-1, 220-2 of low-band radiating elements 224, and each linear array 220 of low-band radiating elements 224 is positioned between the planar arrays 240, 250 of high-band radiating elements 244, 254 and a respective one of the linear arrays 230 of mid-band radiating elements 234. It will be appreciated that antenna 100 illustrates one typical layout of arrays of low-band, mid-band and high-band radiating elements. Many other array configurations are routinely used based on applications and customer requirements. For example, the first and second planar arrays 240, 250 of high-band radiating elements 244, 254 may be omitted in another example embodiment or replaced with two additional mid-band linear arrays 230. The radiating elements according to embodiments of the invention may be used in arrays having any suitable configuration.

The low-band radiating elements 224 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.). The mid-band radiating elements 234 may be configured to transmit and receive signals in a second frequency band. In some embodiments, the second frequency band may comprise the 1427-2690 MHz frequency range or a portion thereof (e.g., the 1710-2200 MHz frequency band, the 2300-2690 MHz frequency band, etc.). The high-band radiating elements 244, 254 may be configured to transmit and receive signals in a third frequency band. In some embodiments, the third frequency band may comprise the 3300-4200 MHz frequency range or a portion thereof. The two low-band linear arrays 220-1, 220-2 may or may not be configured to transmit and receive signals in the same portion of the first frequency band. For example, in one embodiment, the low-band radiating elements 224 in the first linear array 220-1 may be configured to transmit and receive signals in the 700 MHz frequency band and the low-band radiating elements 224 in the second linear array 220-2 may be configured to transmit and receive signals in the 800 MHz frequency band. In other embodiments, the low-band radiating elements 224 in both the first and second linear arrays 220-1, 220-2 may be configured to transmit and receive signals in the same frequency band to, for example, support the use of multi-input-multi-output ("MIMO") communication techniques. The mid-band and high-band radiating elements 234, 244, 254 in the different mid-band and high-band arrays 230, 240, 250 may similarly have any suitable configuration. The radiating elements 224, 234, 244, 254 may be dual polarized radiating elements (e.g., −45°/+45° cross-dipole radiating elements or −45°/+45° polarized patch radiating elements), and hence each array 220, 230, 240 250 may be used to form a pair of antenna beams, namely an antenna beam for each of the two polarizations at which the dual-polarized radiating elements are designed to transmit and receive RF signals.

While not shown in the figures, the radiating elements 224, 234, 244, 254 may be mounted on feed boards that couple RF signals to and from the individual radiating elements 224, 234, 244, 254. One or more radiating elements 224, 234, 244, 254 may be mounted on each feed board. Cables may be used to connect each feed board to other components of the antenna such as diplexers, phase shifters or the like.

While cellular network operators are interested in deploying antennas that have a large number of arrays of radiating elements in order to reduce the number of base station antennas required per base station, increasing the number of arrays typically increases the width of the antenna. Both the weight and wind loading of a base station antenna increase with increasing width, and thus wider base station antennas tend to require structurally more robust antenna mounts and antenna towers, both of which can significantly increase the cost of a base station. Accordingly, cellular network operators may place limitations on the widths of base station antennas (where the limits may depend on the application for the antenna).

The width of a multi-band base station antenna may be reduced by decreasing the separation between adjacent arrays. However, as the separation is reduced, increased interaction between the radiating elements of the different arrays occurs, and this increased interaction may impact the shapes of the antenna beams generated by the arrays in undesirable ways. For example, a low-band cross-dipole radiating element will typically have dipole radiators that each have a length that is approximately ½ a wavelength of the center frequency of the designed operating frequency band for the radiating element. Each dipole radiator typically comprises a pair of center-fed dipole arms that each have a length that is approximately ¼ a wavelength of the center frequency of the designed operating frequency band for the radiating element. If, for example, the low-band radiating element is designed to operate in the 900 MHz frequency band, and the mid-band radiating elements are designed to operate in the 1800 MHz frequency band, the length of the low-band dipole radiators will be approximately one wavelength at the mid-band operating frequency. As a result, each dipole arm of a low-band dipole radiator will have a length that is approximately ½ wavelength at the mid-band operating frequency, and hence RF energy transmitted by the mid-band radiating elements will tend to couple to the dipole arms of the low-band radiating elements since such RF energy will be resonant in ½ wavelength dipole arm.

When mid-band and/or high-band RF energy couples to the dipole arms of a low-band radiating element, respective mid-band and/or high-band currents are induced on the dipole arms. Such induced currents are particularly likely to occur when the low-band and mid-band radiating elements are designed to operate in frequency bands having center frequencies that are separated by about a factor of two (or four), since a low-band dipole arm having a length that is a quarter wavelength of the low-band operating frequency will, in that case, have a length of approximately a half wavelength (or a full wavelength) of the higher band operating frequency. The induced currents generate mid-band (and/or high-band) RF radiation that is emitted from the low-band dipole arms. The mid-band/high-band RF energy emitted from the dipole arms of the low-band resonating element distorts the antenna beam of the mid-band and/or high-band arrays since the radiation is being emitted from a different location than intended. The greater the extent that mid-band/high-band currents are induced on the low-band dipole arms, the greater the impact on the characteristics of the antenna beams generated by the mid-band and high-band arrays.

The low-band radiating elements 224 according to embodiments of the present invention may be designed to be substantially transparent to RF energy emitted by the mid-band and/or high-band radiating elements 234, 244, 254. As such, even if the mid-band and high-band radiating elements 234, 244, 254 are in close proximity to the low-band radiating elements 224, the above-discussed undesired coupling of mid-band and/or high-band RF energy onto the low-band radiating elements 224 may be significantly reduced.

Figure 4A:
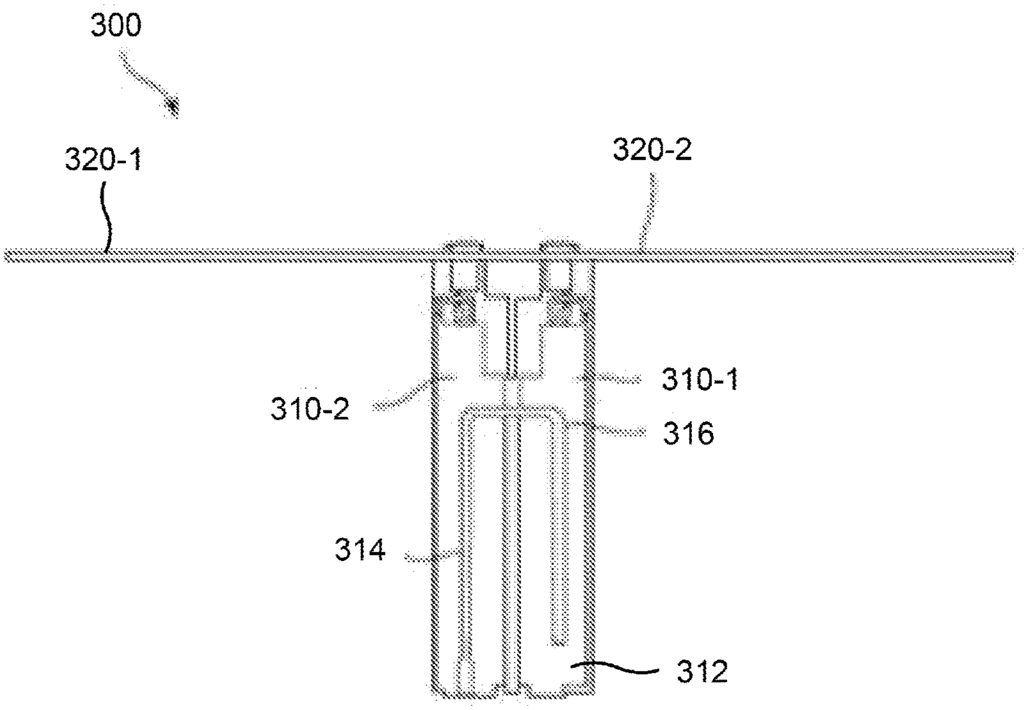
FIG. 4A is a side view of one of the low-band radiating elements of the base station antenna of FIGS. 1-3.
Figure 4B:
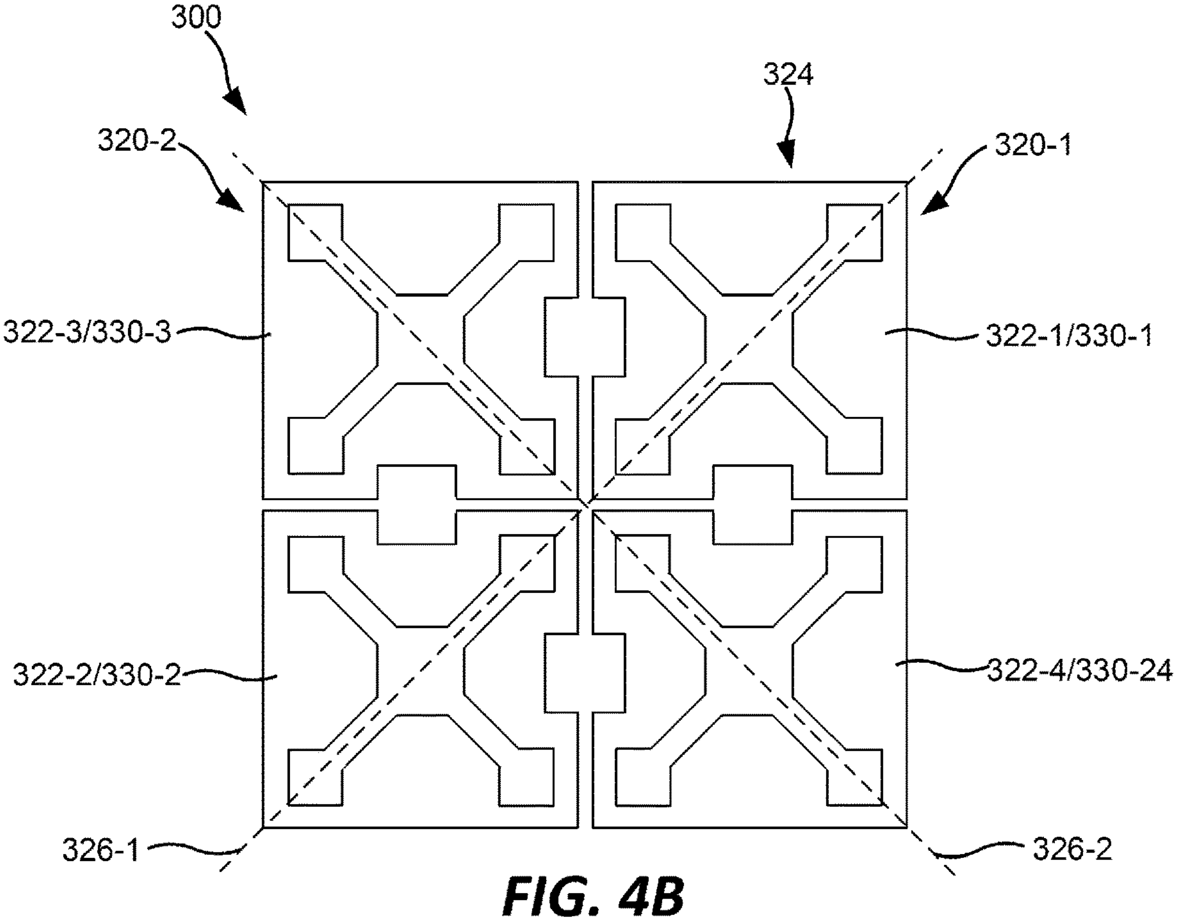
FIG. 4B is a front view of the dipole radiators of the low-band radiating element of FIG. 4A.
Figure 4C:
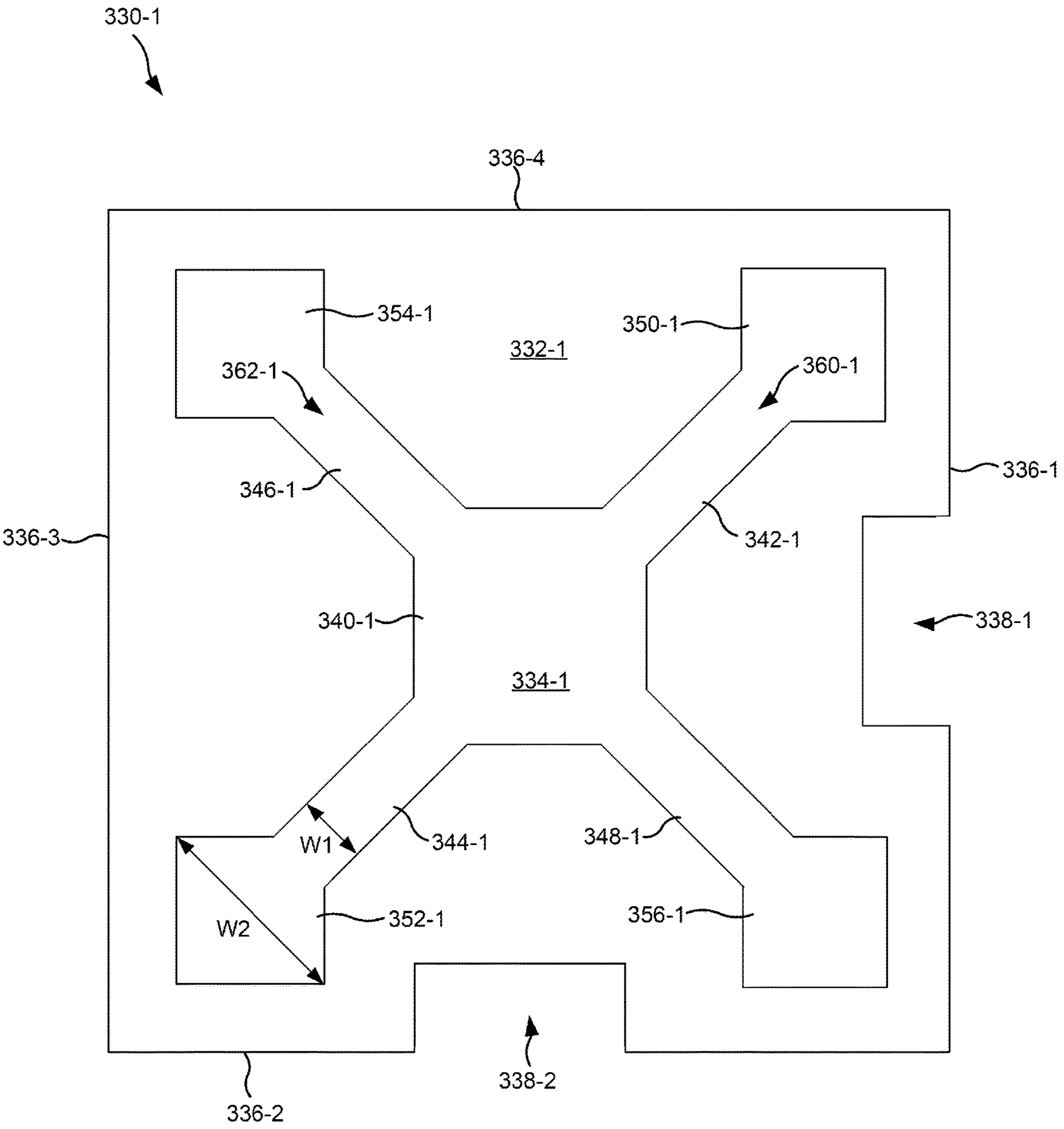
FIG. 4C is a greatly enlarged front view of one of the dipole arms of the low-band radiating element of FIGS. 4A-4B.

FIGS. 4A-4C illustrate a low-band radiating element 300 according to embodiments of the present invention that may be used to implement the low-band radiating elements 224 of base station antenna 100. In particular, FIG. 4A is a side view of the low-band radiating element 300, FIG. 4B is a front view of the dipole radiators 3204, 320-2 of the low-band radiating element 300, and FIG. 4C is a greatly enlarged front view of dipole arm 3304 of low-hand radiating element 300 of FIGS. 4A-4B.

Referring to FIG. 4A, the low-band radiating element 300 includes a pair of feed stalks 310, and the dipole radiators 320-1, 320-2. In some embodiments, the feed stalks 310 may each comprise a printed circuit board 312 that has RF transmission lines 314 formed thereon. These RF transmission lines 314 carry RF signals between a feed board (not shown) that is mounted on the reflector 214 and the dipole radiators 320. The feed stalks 310 extend rearwardly from a plane defined by the dipole radiators 320-1, 320-2. For example, the feed stalks 310 may extend generally perpendicular to plane defined by the dipole radiators 320-1, 320-2.

Each feed stalk 310 may further include a hook balun 316. A first of the feed stalks 310-1 may include a front slit and the second of the feed stalks 310-2 includes a back slit. These slits allow the two feed stalks 310 to be assembled together to form a forwardly extending column that has generally x-shaped vertical cross-sections. Rear portions of each feed stalk 310 may include projections that are inserted through slits in the feed board (not shown) to mount the radiating element 300 thereon. The RF transmission lines 314 on the respective feed stalks 310 may center feed the dipole radiators 320-1, 320-2. While the feed stalks 310 are illustrated as being printed circuit board-based feed stalks, it will be appreciated that embodiments of the present invention are not limited thereto. In other embodiments, sheet metal feed stalks may be used instead (e.g., in the form of four rearwardly-extending dipole legs may be used in conjunction with a pair of sheet metal hook baluns to form the feed stalks 310).

In some embodiments, the first and second dipole radiators 320-1, 320-2 may comprise sheet metal dipole radiators. The first dipole radiator 320-1 includes first and second dipole arms 330-1, 330-2, and the second dipole radiator 320-2 includes third and fourth dipole arms 330-3, 330-4. As shown in FIG. 4B, the dipole radiators 320-1, 320-2 may be implemented in a “cross” arrangement to form a pair of center-fed −45°/+45° dipole radiators 320. Each dipole arm 330 may comprise a separate piece of stamped sheet metal in some embodiments. While sheet metal dipole arms 330 are illustrated in FIG. 4B, it will be appreciated that in other embodiments both dipole radiators 320-1, 320-2 (and their constituent dipole arms 330) may instead be formed on a dipole radiator printed circuit board.

The azimuth half power beamwidths of each low-band radiating element 300 may be in the range of 55° to 85°. In some embodiments, the azimuth half power beamwidth of each low-band radiating element 300 may be approximately 65° in the center of the operating frequency band for the low-band radiating element 300.

Each dipole arm 330 may be between approximately 0.2 to 0.35 of an operating wavelength in length, where the “operating wavelength” refers to the wavelength corresponding to a center frequency of the operating frequency band of the radiating element 300. For example, if the low-band radiating elements 300 are designed to transmit and receive signals across the 694-960 MHz frequency band, then the center frequency of the operating frequency band would be 827 MHz and the corresponding operating wavelength would be 36.25 cm. As used herein, the “length” of a dipole arm refers to the extent of the dipole arm from the base thereof (which typically is the part of the dipole arm that connects to the feed stalk) to the distal end thereof. For the dipole arms 330, the length of each dipole arm is the length of the diagonal of the square defined by the outer perimeter of each dipole arm 330.

Dipole radiator 320-1 may comprise first and second pieces of stamped sheet metal 322-1, 322-2 that form dipole arms 330-1, 330-2. Dipole radiator 320-2 similarly may comprise third and fourth pieces of stamped sheet metal 322-3, 322-4 that form dipole arms 330-3, 330-4. The four dipole arms 330 may be arranged to form a rectangle 324 (typically a square 324), as shown. Dipole arms 330-1, 330-2 extend along one diagonal of the square 324, while dipole arms 330-3, 330-4 extend along the other diagonal of the square 324. In some embodiments, the four dipole arms 330 may extend in a common plane that is parallel to the reflector 214. Each feed stalk 310 may extend in a direction that is generally perpendicular to the plane defined by the dipole arms 330 so that the feed stalks 310 extend in the forward direction.

As shown best in FIG. 4B, the first dipole radiator 320-1 extends along a first axis 326-1 and the second dipole radiator 320-2 extends along a second axis 326-2 that is generally perpendicular to the first axis 326-1. Dipole arms 330-1 and 330-2 of first dipole radiator 320-1 are center fed by a first of the RF transmission lines 314 and radiate together at a first polarization. In the depicted embodiment, the first dipole radiator 320-1 is designed to transmit and receive signals having a +45° polarization. Dipole arms 330-3 and 330-4 of second dipole radiator 320-2 are center fed by a second of the RF transmission lines 314 and radiate together at a second polarization that is orthogonal to the first polarization. The second dipole radiator 320-2 is designed to transmit and receive signals having a −45° polarization. The dipole arms 330 may be mounted approximately 3/16 to 1/4 an operating wavelength forwardly of the reflector 214 by the feed stalks 310.

Referring again to FIGS. 2 and 3, it can be seen that the low-band radiating elements 224 (300) extend farther forwardly from the reflector 214 than do both the mid-band radiating elements 234 and the high-band radiating elements 244, 254. In order to keep the width of the base station antenna 100 relatively narrow, the low-band radiating elements 224 (300) may be located in very close proximity to both the mid-band radiating elements 234 and the high-band radiating elements 244, 254. In the depicted embodiment, each low-band radiating element 224 (300) that is adjacent a linear array 230 of mid-band radiating elements 234 may overlap a substantial portion of two of the mid-band radiating elements 234. Likewise, each low-band radiating element 224 (300) that is adjacent an array 240, 250 of high-band radiating elements 244, 254 may overlap at least a portion of one or more of the high-band radiating elements 244, 254. This arrangement allows for a significant reduction in the width of the base station antenna 100. Herein, two radiating elements "overlap" if an axis that is perpendicular to a plane defined by the reflector on which the radiating elements are mounted passes through both radiating elements.

While positioning the low-band radiating elements 224 (300) so that they overlap the mid-band and/or the high-band radiating elements 234, 244, 254 may advantageously, facilitate reducing the width of the base station antenna 100, this approach may significantly increase the coupling of RF energy transmitted by the mid-band and/or the high-band radiating elements 234, 244, 254 onto the low-band radiating elements 224 (300), and such coupling may result in scattering that degrades the antenna beams formed by the arrays 230, 240, 250 of mid-band and/or high-band radiating elements 234, 244, 254.

In order to reduce such coupling, the low-band radiating elements 300 may be designed to have dipole arms 330 that are substantially "transparent" to radiation emitted by either or both the mid-band radiating elements 234 and the high-band radiating elements 244, 254. This may be challenging, as the mid-band radiating elements 234 may operate (in some cases) at frequencies as low as 142.7 MHz and the high-band radiating elements 244, 254 may operate (in some cases) at frequencies as high as 4200 MHz. Thus, ideally the low-band radiating elements 300 are substantially transparent to RF energy in the 1427-4200 MHz frequency range, while allowing currents in the 617-960 MHz frequency range to flow freely on the dipole arms 330. Herein, a dipole arm of a radiating element that is configured to transmit RF energy in a first frequency band is considered to be "transparent" to RF energy in a second, different, frequency band if the RF energy in the second frequency hand poorly couples to the dipole arm. Accordingly, if a dipole arm of a first radiating element that is transparent to a second frequency band is positioned so that it overlaps a second radiating element that transmits in the second frequency band, the addition of the first radiating element will not materially impact the antenna pattern of the second radiating element.

FIG. 4C is a greatly enlarged front view of dipole arms 330-1. Referring to FIG. 4C, the piece of sheet metal used to form the first dipole arm 330-1 is stamped to create an opening in a central region thereof. As a result, the first dipole arm 330-1 comprises a first metal region 332-1 that substantially surrounds a first non-metal interior region 334-1. In the depicted embodiment, first metal region 332-1 completely surrounds the first non-metal interior region 334-1. An outer perimeter of the first metal region 332-1 may be substantially rectangular in some embodiments. In the depicted embodiment, the outer perimeter of the first metal region 332-1 is substantially square having first through fourth side edges 336-1 through 336-4.

The outer perimeter of the first metal region 332-1 is only "substantially" square because first and second recesses 338-1, 338-2 are formed in the outer portion of first and second sides of the first metal region 332-1. The first and second recesses, 338-1, 338-2 each have a rectangular shape in the depicted embodiment, and are centered approximately midway along the respective first and second sides of the first metal region 332-1. Each dipole arm 330 includes the first and second recesses 338-1, 338-2 which are arranged so that the first recess 338-1 on each dipole arm 330 faces the second recess 338-2 on an adjacent dipole arm 330. The recesses 338 may reduce unwanted coupling between the first and second dipole radiators 320-1, 320-2, which may improve the cross-polarization discrimination performance of the low-band linear arrays 220. It will be appreciated that in other embodiments more than one recess 338 may be provided on each side edge 336, recesses 338 may be provided on the outer side edges 336-3, 336-4, the recesses 338 may be omitted, and/or the size and/or the shape of the recesses 338 may be varied from what is shown.

The first metal region 332-1 may be a substantially flat piece of metal in some embodiments that has an opening formed therein. The first metal region 332-1 may be formed by stamping a piece of sheet metal to remove the metal corresponding to the opening. The first metal region 332-1 may completely surround the opening to enclose the opening in some embodiments. The first metal region 332-1 may have an out perimeter that substantially defines a square. The first metal region 332-1 may comprise, for example, aluminum, steel or copper, or alloys thereof. In other embodiments, the first metal region 332-1 may not be flat. For example, outer edges of the first metal region 332-1 may be bent rearwardly (or forwardly) to increase the size of dipole arm 330-1 without increasing the footprint thereof (the footprint of a dipole arm refers to perimeter of the dipole arm when viewed from the front). Additionally or alternatively, edges of the interior opening may be bent rearwardly (or forwardly) for the same purpose. In such embodiments, the metal corresponding to the opening may not be fully removed, but instead portions of the metal corresponding to the opening are bent rearwardly.

The first non-metal interior region 334-1 comprises a central opening 340-1 and first through fourth auxiliary openings 342-1, 344-1, 346-1, 348-1 that extend outwardly from the central opening 340-1. In the depicted embodiment, the central opening 340-1 has a square shape, and the first through fourth auxiliary openings 342-1, 344-1, 346-1, 348-1 extend radially outwardly from the central opening 340-1. The first and second auxiliary openings 342-1, 344-1 comprise first and second collinear segments of a first slot 360-1 that extends through the central opening 340-1. The third and fourth auxiliary openings 346-1, 348-1 comprise third and fourth collinear segments of a second slot 362-1 that extends through the central opening 340-1. A longitudinal axis of the first slot 360-1 intersects a longitudinal axis of the second slot 362-1 at an angle of 90°. The first slot 360-1 extends at an angle of −45° and hence extends along the direction of polarization of the first dipole radiator 320-1. The second slot 362-1 extends at an angle of +45° and hence extends along the direction of polarization of the second dipole radiator 320-2. It may be easier to control current distribution on the dipole arms 330 when the first and second slots 360, 362 are aligned along the directions of the respective polarizations. As noted above, the outer perimeter of the first metal region 332-1 may be substantially square in some embodiments. In such embodiments, longitudinal axes of the first and second slots 360-1, 362-1 may extend along the respective diagonals defined by the substantially square outer perimeter of the first metal region 332-1.

The plurality of auxiliary openings may further comprise a plurality of satellite openings 350-1, 352-1, 354-1, 356-1. In the depicted embodiment, each satellite opening 350-1, 352-1, 354-1, 356-1 has a square shape and merges into a distal end of a respective one of the first through fourth segments of the first and second slots 360-1, 362-1. In other words, the distal ends of the first through fourth segments terminate into the respective square-shaped satellite openings 350-1, 352-1, 354-1, 356-1. The longitudinal axis of first slot 360-1 may be aligned with one of the diagonals of square-shaped satellite openings 350-1, 352-1, and the longitudinal axis of second slot 362-1 may be aligned with one of the diagonals of square-shaped satellite openings 354-1, 356-1. The first and second segments of the first slot 360-1 each have a width W1. The width W2 of each of the first and second satellite openings 350-1, 352-1 (where the widths W1 and W2 refer to the extent of the segments/satellite openings in a direction that is perpendicular to the longitudinal axis of the first slot 360-1 in the plane defined by the dipole radiators 320-1, 320-2) may be greater than the width W1 of the first and second segments. As such, the first and second satellite openings 350-1, 352-1 enlarge the distal ends of the first and second segments of the first slot 360-1.

Each of the second through fourth dipole arms 330-2 through 330-4 may have the same exact shape as the first dipole arm 330-1 (although each dipole arm 330 is oriented differently from the other dipole arms 330, as shown in FIG. 4B). Thus, for example, the second dipole arm 330-2 comprises a second metal region 332-2 that substantially surrounds a second non-metal interior region 334-2. The second non-metal interior region 334-2 comprises first and second slots 360-2, 362-2. A longitudinal axis of the first slot 360-2 intersects a longitudinal axis of the second slot 362-2 at an angle of 90°. Notably, the first slot 360-1 of the first dipole arm 330-1 is collinear with the first slot 360-2 of the second dipole arm 330-2. The second slot 362-1 of the first dipole arm 330-1 extends in parallel with (but not collinear with) the second slot 362-2 of the second dipole arm 330-2.

Each dipole arm 330 may be configured to suppress currents from forming thereon in response to RF radiation emitted by mid-band radiating elements 234 and/or high-band radiating elements 244, 254 that may be positioned near the low-band radiating element 300. In particular, each dipole arm 330 may be configured so that the instantaneous direction of a first current formed on a first portion of the dipole arm 330 in response to RF radiation emitted by the mid-band or high-band radiating elements 234, 244.254 will be substantially opposite the instantaneous direction of a second current formed on a second portion of the dipole arm 330 in response to the mid-band or high-band RF radiation. As such, the first and second currents "flowing" on the dipole arm 330 will tend to cancel each other out, suppressing the formation of currents on the low-band dipole arm 330 in response to RF radiation emitted by the nearby mid-band and/or high-band radiating elements 234, 244, 254. This may be accomplished by shaping the first non-metal interior region 334-1 to make the first metal region 332-1 act as a frequency selective surface that conducts currents excited in response to RF energy in the first operating frequency band while cancelling currents excited in response to RF energy in the second operating frequency band. In contrast, currents induced in the dipole arms 330 in response to RF energy in the low-band frequency range have the same current direction, so that the dipole arms will effectively transmit and receive in the low-band.

Figure 5A:
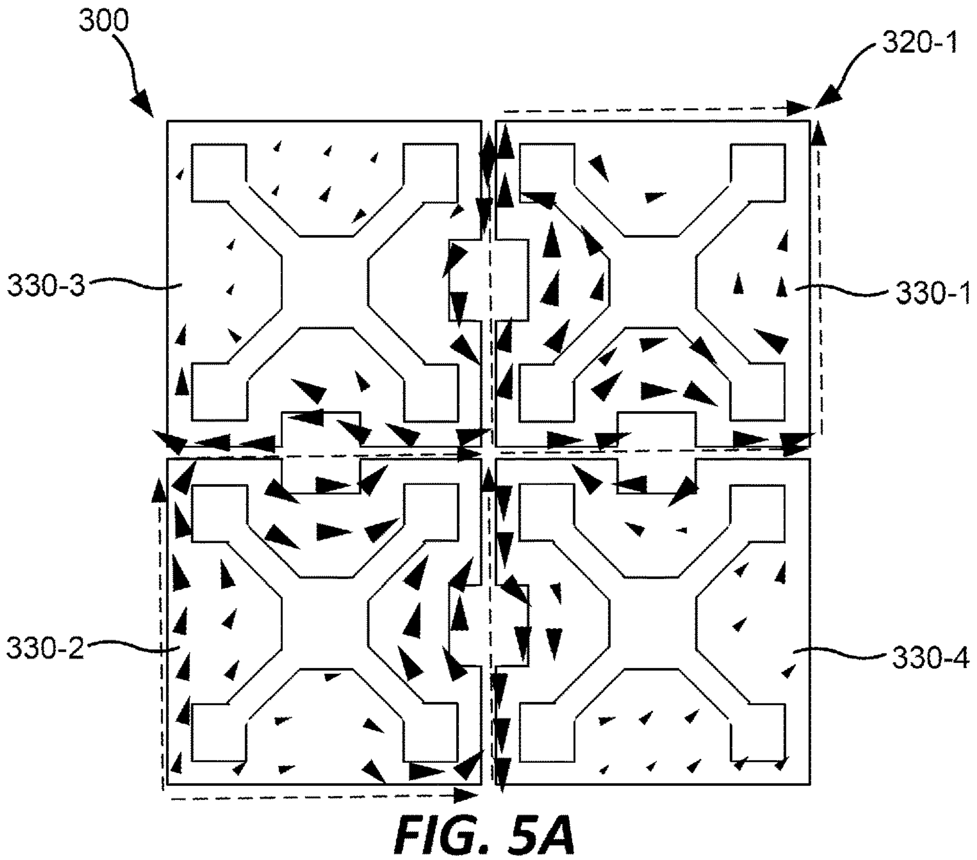
FIG. 5A is a front view of the low-band radiating element of FIGS. 4A-4B that shows the current distribution when the +45" dipole radiator is fed a low-band RF signal.
Figure 5B:
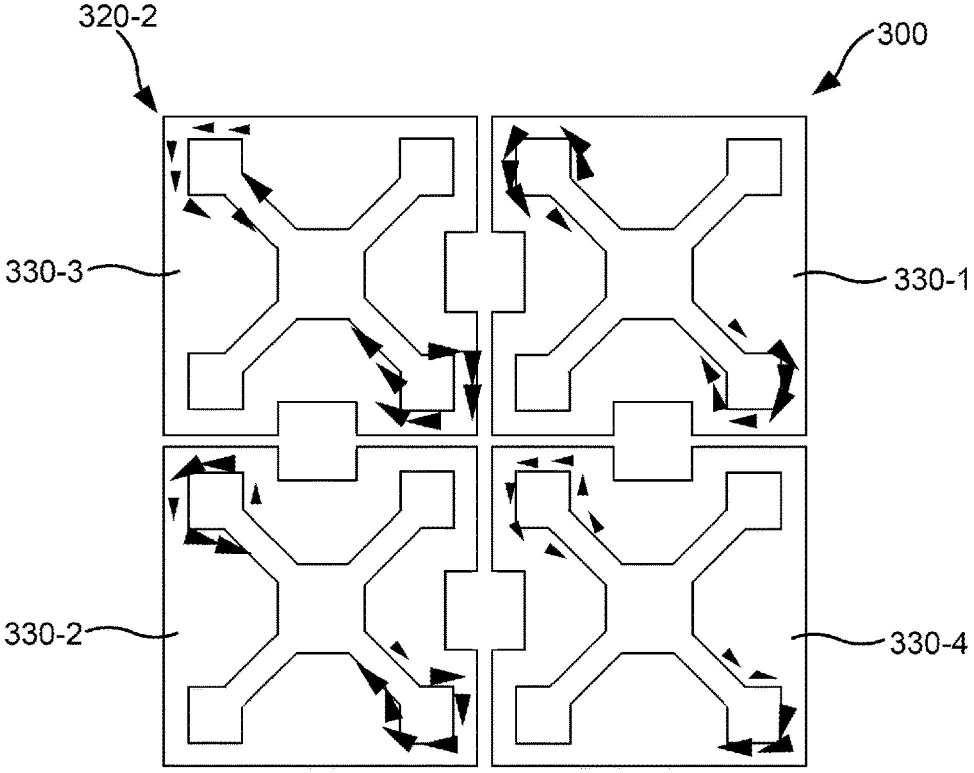

FIGS. 5A and 5B are front views of radiating element 300 that show the simulated current density on the dipole arms 330 thereof in response to RF energy in the low-band operating frequency band and the high-band operating frequency band, respectively. In FIGS. 5A and 5B, the triangles show the currents that are induced on the dipole arms 330, with the apex of each triangle denoting current direction and the size of each triangle indicating the density of the current (with larger triangles designating larger current densities). The dashed horizontal and vertical vectors in FIG. 5A show the general direction of the current flow on the dipole arms 330 in response to low-band RF energy.

As shown in FIG. 5A, when the +45° dipole radiator 320-1 of radiating element 300 is fed low-band RF energy, low-band currents are induced primarily on dipole arms 330-1 and 330-2, with much smaller currents being induced on dipole arms 330-3 and 330-4 due to non-perfect discrimination between the two dipole radiators 320-1, 320-2. As shown by the dashed vectors, on dipole arm 330-2 the current flows from the distal end toward the base, and on dipole arm 330-1 the current flows from the base toward the distal end. The strongest currents on each dipole arm 330 flow along the two inner side edges 336-1, 336-2 of each dipole arm 330, flowing in the horizontal direction on one of the inner side edges and in the vertical direction on the other inner side edge. These currents are substantially equal in magnitude and together generate RF radiation having a +45° polarization, as is well understood by those of skill in the art. Thus, FIG. 5A shows that radiating element 300 will effectively radiate low-band RF energy at the desired polarizations.

FIG. 5B illustrates the current distribution on the dipole arms 330 when a nearby higher-band radiating element emits RF energy. In FIG. 5B, the nearby higher-band radiating element is emitting RF radiation having a −45° polarization, so it can be seen that the higher band currents that are induced on the dipole arms 330 are induced along edges of the second slots 362 that extend at a −45° angle and extend around the satellite openings 354, 356 of the second slots 362. As shown in FIG. 5B, these higher-band currents are generated along both sides of the second slots 362. As a result, the currents flowing on one side of a given second slot 362 tend to be equal and opposite to the currents flowing on the other side of the second slot 362. The same is true with respect to the currents flowing around the satellite openings 354, 356. The net result is that the higher-band currents tend to cancel out, resulting in very little net higher-band current flow on the dipole arms 330. As can also be seen in FIG. 5B, the amount of higher-band current flow on other portions of the dipole arms 330 is very low. Accordingly, the dipole arms 330 tend to be substantially invisible to the higher-band currents such that only very low-levels of higher-band current are effectively induced on the dipole arms 330. As a result, radiating element 300 will not materially impact the radiation pattern of nearby higher-band radiating elements, including higher-band radiating elements that are mounted directly behind radiating element 300.

As the above discussion makes clear, radiating element 300 works to suppress generation of higher-band currents by configuring the non-metal interior region 334 of each dipole arm 330 so that currents induced on a first portion of the metal region 332 of the dipole arm 330 by RF energy emitted by a second nearby radiating element substantially cancel currents induced on a second portion of the metal region 332 by the RF energy emitted by the nearby second radiating element.

It will be appreciated that many modifications may be made to the radiating element 300 and it will still provide the same cloaking performance, so long as the non-metal interior region 334 of each dipole arm 330 is configured so that currents induced on a first portion of the metal region 332 by RF energy emitted by a nearby, higher-band second radiating element substantially cancel currents induced on a second portion of the metal region 332 by the RF energy emitted by the nearby second radiating element. FIGS. 6A-6G illustrate additional example radiating elements that may provide the same type of cloaking performance. In each figure, only the upper left dipole arm of the radiating element is illustrated to simplify the drawings. It will be appreciated that the radiating elements shown in FIGS. 6A-6G will each have four dipole arms that are arranged in the manner shown in FIG. 4B.

Figure 6A:
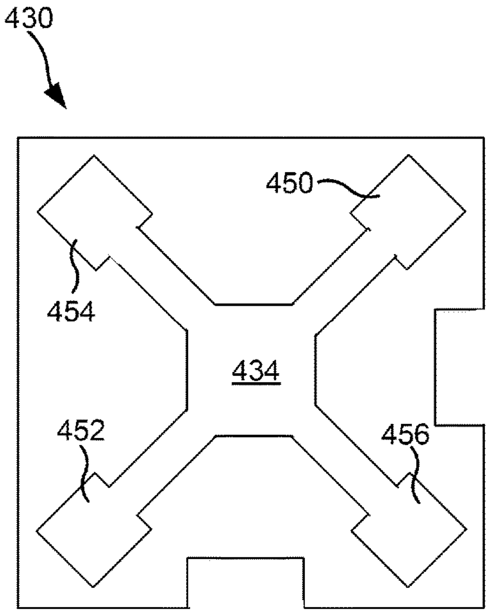
FIGS. 6A-6G are front views of low-band radiating elements according to further embodiments of the present invention.

Referring to FIG. 6A, a dipole arm 430 of a radiating element according to further embodiments of the present invention is shown. Dipole arm 430 is similar to dipole arm 330-1 of FIG. 4C, except that the satellite openings 450, 452, 454, 456 of the non-metal interior region 434 of dipole arm 430 are each rotated 45° with respect to the satellite openings 350, 352, 354, 356 of the non-metal interior region 334-1 of dipole arm 330-1. As all other aspects of dipole arm 430 may be identical to dipole arm 330-1, further description of dipole arm 430 or the operation thereof will be omitted.

Figure 6B:
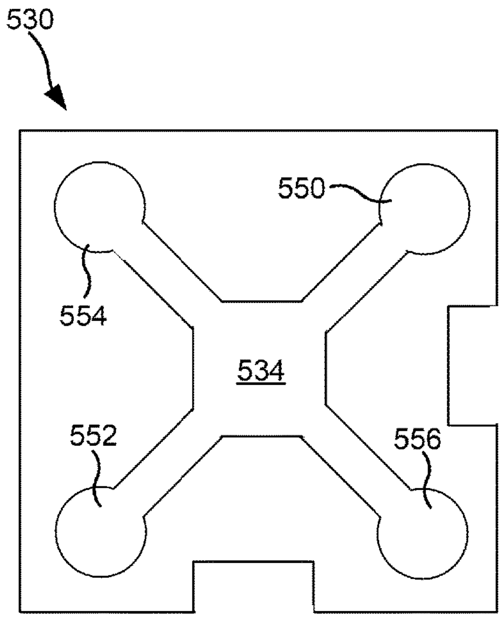

Referring to FIG. 6B, a dipole arm 530 of a radiating element according to further embodiments of the present invention is also similar to dipole arm 330-1 of FIG. 4C, except that the satellite openings 550, 552, 554, 556 of the non-metal interior region 534 of dipole arm 530 each have a circular shape as opposed to being square satellite openings 350, 352, 354, 356 as is the case with dipole arm 330-1. As all other aspects of dipole arm 530 may be identical to dipole arm 330-1, further description of dipole arm 530 or the operation thereof will be omitted. It will be appreciated that the satellite openings may have a wide variety of different shapes such as, for example, hexagons, octagons and the like in dipole arms according to further embodiments of the present invention.

Figure 6C:
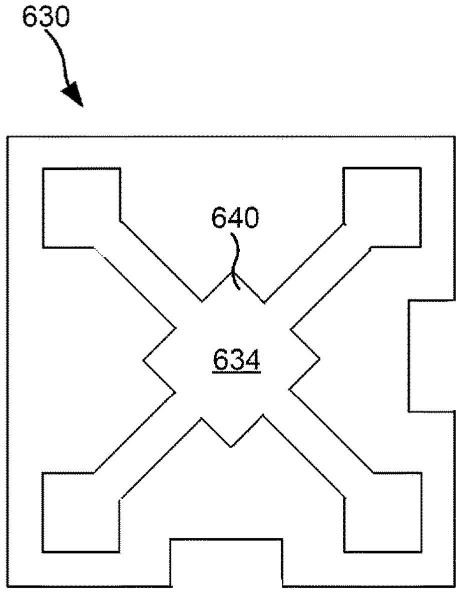

Referring to FIG. 6C, a dipole arm 630 of a radiating element according to further embodiments of the present invention is also similar to dipole arm 330-1 of FIG. 4C, except that the square central opening 640 of the non-metal interior region 634 of dipole arm 630 is rotated 45° with respect to the square central opening 340-1 of dipole arm 330-1. As all other aspects of dipole arm 630 may be identical to dipole arm 330-1, further description of dipole arm 630 or the operation thereof will be omitted.

Figure 6D:
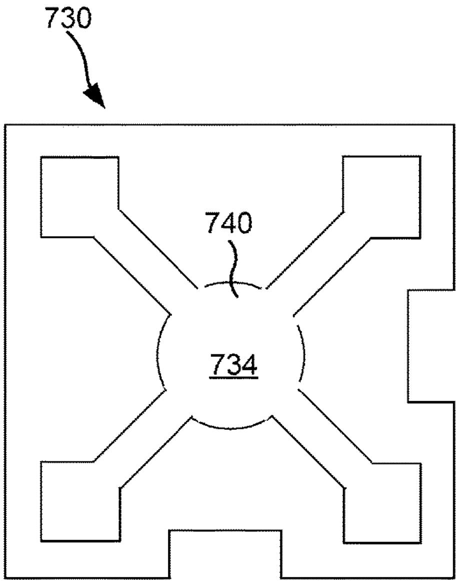

Referring to FIG. 6D, a dipole arm 730 of a radiating element according to further embodiments of the present invention is shown that is similar to dipole arm 330-1 of FIG. 4C, except that the central opening 740 of the non-metal interior region 734 of dipole arm 730 has a circular shape as opposed to being square central openings 340 as is the case dipole arm 330-1. As all other aspects of dipole arm 730 may be identical to dipole arm 730-1, further description of dipole arm 730 or the operation thereof will be omitted. It will be appreciated that the central opening may have a wide variety of different shapes such as, for example, hexagons, octagons and the like in dipole arms according to further embodiments of the present invention.

Figure 6E:
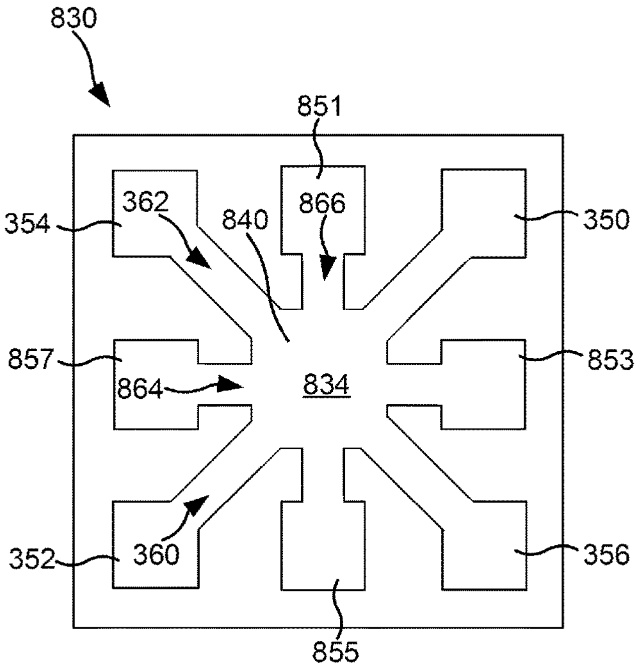

Referring to FIG. 6E, a dipole arm 830 of a radiating element according to further embodiments of the present invention is shown that is also similar to dipole arm 330-1 of FIG. 4C. Dipole arm 830 is identical to dipole arm 330-1 except that the non-metal interior region 834 thereof further includes a third horizontally-oriented slot 864 and a fourth vertically-oriented slot 866 that each extend through the square central opening 840 of the non-metal interior region 834. The non-metal interior region 834 also includes four additional satellite openings 851, 853, 855, 857 that are formed at the ends of the third and fourth slots 864, 866.

Figure 6F:
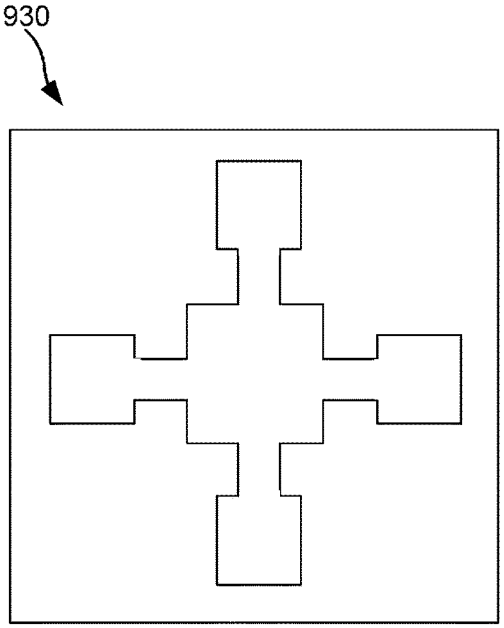

Referring to FIG. 6F, a dipole arm 930 of a radiating element according to further embodiments of the present invention is shown that is similar to dipole arm 830 of FIG. 6E. Dipole arm 930 differs from dipole arm 830 in that the first and second slots 360, 362 are omitted, as are the first through fourth satellite openings 350, 352, 354, 356. Radiating elements having the design of dipole arm 930 may be particularly useful in implementing cross-dipole radiating elements that transmit and receive signals at horizontal and vertical polarizations.

Figure 6G:
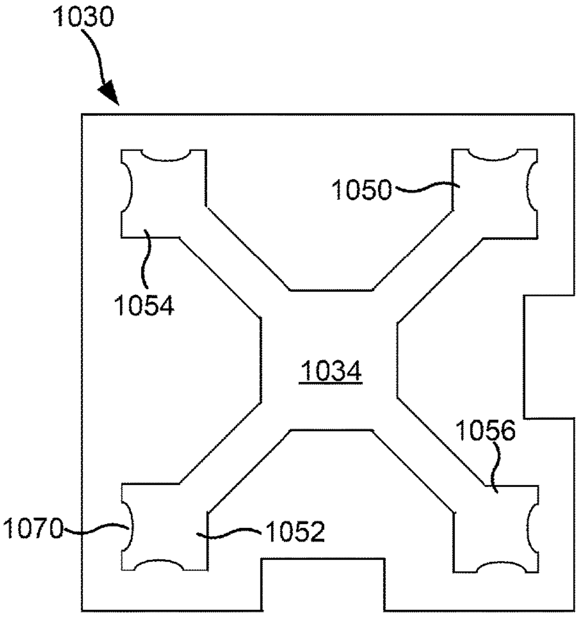

Referring to FIG. 6G, a dipole arm 1030 of a radiating element according to further embodiments of the present invention is shown. Dipole arm 1030 is similar to dipole arm 330-1 of FIG. 4C, except that the satellite openings 1050, 1052, 1054, 1056 of the non-metal interior region 1034 of dipole arm 1030 are formed as squares that have recesses 1070 formed therein. As all other aspects of dipole arm 1030 may be identical to dipole arm 330-1, further description of dipole arm 1030 or the operation thereof will be omitted.

Simulations indicate that the radiating elements according to embodiments of the present invention may provide good performance in the lower frequency band while also providing good cloaking performance with respect to nearby higher-band radiating elements. In some example embodiments, the radiating elements according to embodiments of the present invention may be implemented as low-band radiating elements that operate in all of part of the 617-960 MHz frequency band, and may be designed to cloak, for example, RF energy in the 2.5-2.7 GHz frequency band and/or in the 3.3-3.8 GHz frequency band. It will be appreciated, however, that these are just examples and that the radiating elements according to embodiments of the present invention may be designed to operate in different other frequency bands than discussed above and/or to provide cloaking in different frequency bands. For example, in other embodiments, the radiating elements may be designed to operate in all or part or the 1.695-2.690 GHz frequency band and may be designed to cloak, for example, RF energy in the 3.3-3.8 GHz frequency band.

Figure 8:
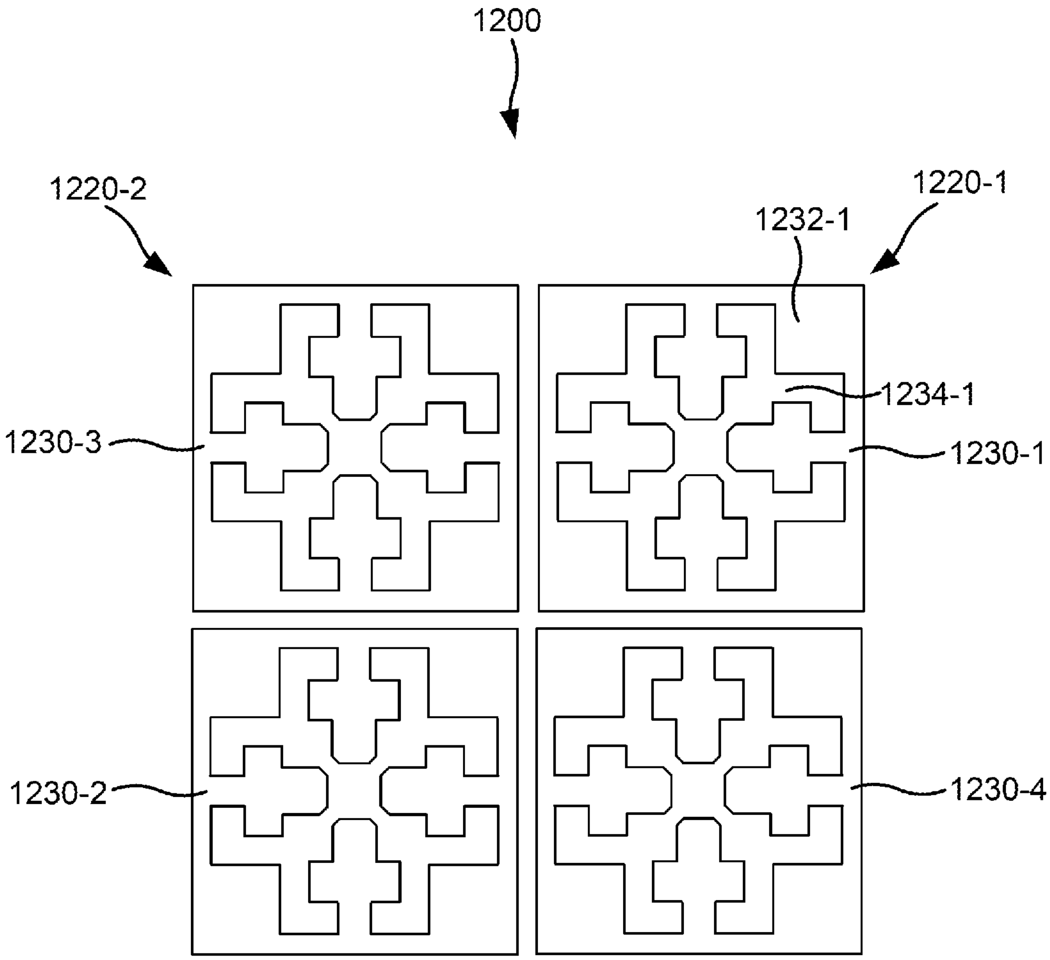
FIG. 8 is a front view of a mid-band radiating element according to further embodiments of the present invention.

For example, FIG. 8 is a front view of a mid-band radiating element 1200 according to further embodiments of the present invention that is cloaking with respect to nearby, high-band radiating elements. The mid-band radiating element 1200 may be designed, for example, to operate in the 1.695-2.690 GHz frequency band, and may be designed to be cloaking with respect to nearby radiating elements that operate in the 3.3-3.7 GHz frequency band. The mid-band radiating element 1200 includes a first dipole radiator 12204 that includes dipole arms 12304 and 1230-2, and a second dipole radiator 1220-2 that includes dipole arms 1230-3 and 1230-4. Each dipole arm includes a metal region 1232 that surrounds a non-metal interior region 1234. As the mid-band radiating element 1200 operates in the same fashion as the other radiating elements according to embodiments of the present invention that are described above, further description thereof is omitted here.

As discussed above, the radiating elements according to embodiments of the present invention are formed using dipole arms that have metal regions that surround non-metal interior regions. The shape of the non-metal interior region may be designed so that the dipole arms operate as "normal" dipole arms in the operating frequency band of the dipole arm, thereby allowing currents in that frequency band to flow freely without cancellation, while the shape of the non-metal interior region is also designed so that currents induced on a first portion of the metal region of the dipole arm in response to higher-band RF energy emitted by a nearby radiating element substantially cancel currents induced on a second portion of the metal region by the RF energy emitted by the nearby radiating element. In order to have this characteristic, the non-metal interior region may have a plurality of sections that together define a ring structure. The higher-band currents are differential mode currents that are induced from the RF radiation from a nearby higher-band radiating element. These higher-band currents flow on the metal regions around the individual sections of the non-metal interior region. The individual sections of the non-metal interior region are designed so that the higher-band currents flow in different directions as they flow around each section in order to achieve a cancelling effect. In contrast, the lower-band currents do not cancel since the lower-band energy is excited through the feed stalk so that the low-band currents have the same direction (e.g., slant 45°) as the non-metal interior region.

Figure 7:
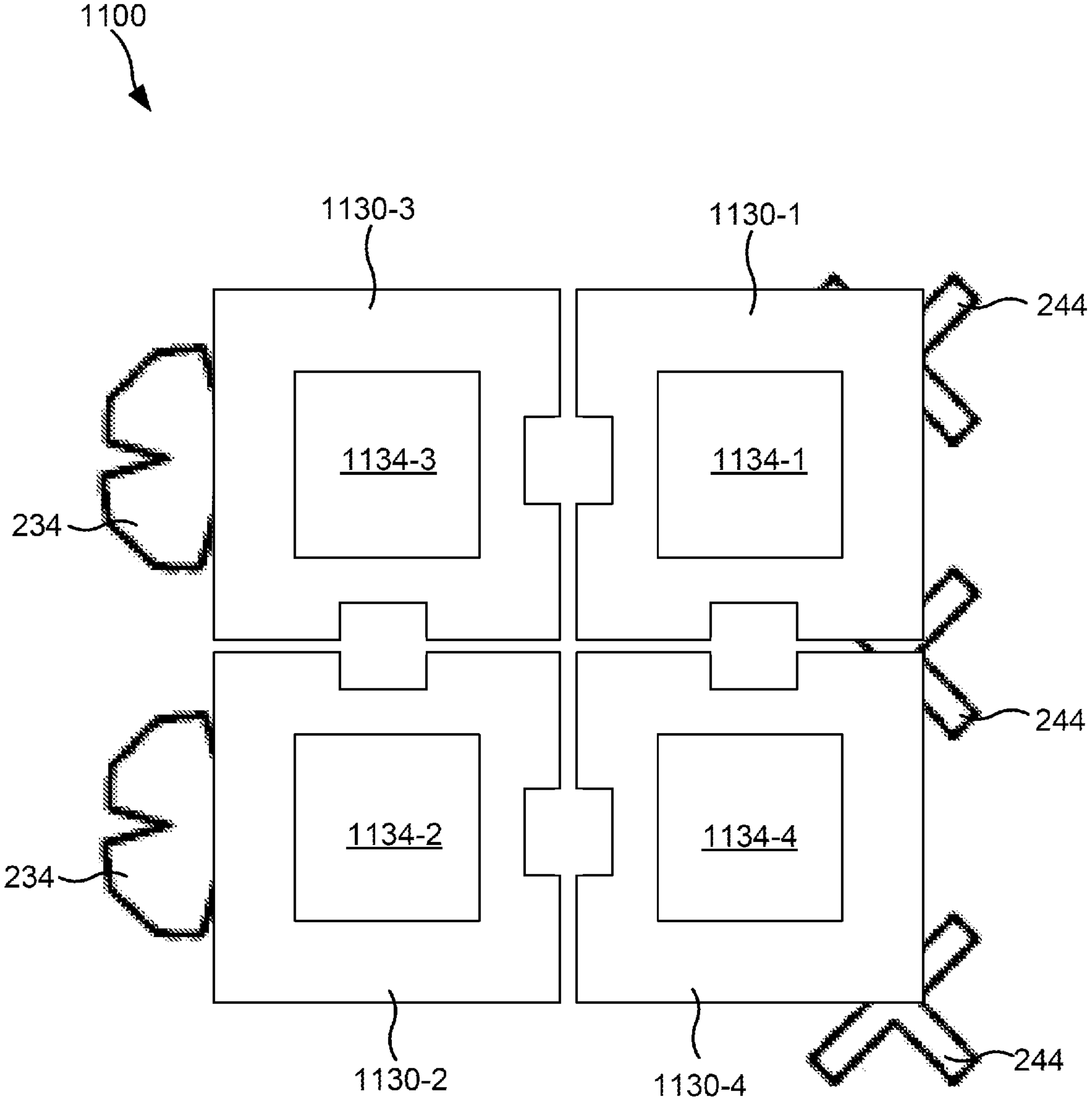
FIG. 7 is a schematic front view of a radiating element according to further embodiments of the present invention that has dipole arms that are designed to be cloaking in different frequency bands.

FIG. 7 is a schematic front view of a radiating element 1100 according to further embodiments of the present invention that has dipole arms 1130 that are designed to be cloaking in different frequency bands. As shown in FIG. 7, radiating element 1100 may be mounted in a base station antenna to overlap two mid-band radiating elements 234 and to overlap several high-band radiating elements 244. Dipole arms 1130-2 and 11303 overlap the mid-band radiating elements 234 while dipole arms 11304 and 1130-4 overlap the high-band radiating elements 244. Consequently, the non-metal interior openings 11342, 11343 of dipole arms 1130-2 and 1130-3 may have a first shape that is designed to suppress mid-band currents, while the non-metal interior openings 11344, 1134-4 of dipole arms 1130-1 and 1130-4 may have a second, different, shape that is designed to suppress high-band currents. Thus, the dipole arms 1130 of each dipole radiator of radiating element 1100 may be imbalanced so that the portions of radiating element 1104) that overlap the mid-band radiating elements 234 provide good cloaking with respect to mid-band currents, and the portions of radiating element 1100 that overlap the high-band radiating elements 244 provide good cloaking with respect to high-band currents.

The radiating elements according to embodiments of the present invention may provide a number of advantages. As noted above, the dipole arms implement cloaking without using LC circuits, and hence they do not have the large inductance values that are present in many conventional dipole arms that can make impedance matching the dipole arms to the feed stalks difficult. Thus, the cloaking radiating elements according to embodiments of the present invention may support larger operating bandwidths than many conventional cloaking radiating elements. Additionally, since each dipole arm of the radiating elements according to embodiments of the present invention may be formed from a single continuous piece of metal, the dipole arms can readily be formed by simply stamping sheet metal, which may dramatically reduce the cost of the radiating element.

While the dipole arms of the low-band radiating elements described above are implemented using stamped sheet metal, it will be appreciated that embodiments of the present invention are not limited thereto. For example, in other embodiments, all four dipole arms may be implemented on a dipole radiator printed circuit board.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Herein, the term "substantially" means within +/−10%.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

The invention claimed is:

1. An antenna, comprising:

a reflector;

a first radiating element extending forwardly from the reflector that is configured to operate in a first operating frequency band; and a second radiating element extending forwardly from the reflector that is configured to operate in a second operating frequency band that encompasses higher frequencies than the first operating frequency band;

wherein the first radiating element includes a first dipole radiator having a first dipole arm and a second dipole arm and a second dipole radiator having a third dipole arm and a fourth dipole arm, wherein the first dipole arm comprises a first metal region that substantially surrounds a first non-metal interior region, and the first non-metal interior region is configured so that currents induced on a first portion of the first metal region by radio frequency ("RF") energy emitted by the second radiating element substantially cancel currents induced on a second portion of the first metal region by the RF energy emitted by the second radiating element.

2. The antenna of claim 1, wherein the first metal region comprises a closed loop that completely surrounds the first non-metal interior region.

3. The antenna of claim 1, wherein the first non-metal interior region comprises first and second slots in the first metal region where metal is omitted, and wherein a longitudinal axis of the first slot intersects a longitudinal axis of the second slot at an angle of 90°.

4. The antenna of claim 1, wherein the first non-metal interior region comprises a central opening and first and second auxiliary openings that extend outwardly from the central opening.

5. The antenna of claim 4, wherein the first and second auxiliary openings comprise first and second collinear segments of a first slot that extends through the central opening.

6. The antenna of claim 5, wherein the central opening further includes third and fourth auxiliary openings that extend outwardly from the central region, the third and fourth auxiliary openings comprising third and fourth collinear segments of a second slot that extends through the central opening.

7. The antenna of claim 6, wherein the first slot intersects the second slot at an angle of 90°.

8. The antenna of claim 1, wherein the first non-metal interior region comprises a central opening and a plurality of auxiliary openings that extend radially outwardly from the central opening.

9. An antenna, comprising:

a reflector;

a first radiating element extending forwardly from the reflector that is configured to operate in a first operating frequency band; and a second radiating element extending forwardly from the reflector that is configured to operate in a second operating frequency band that encompasses higher frequencies than the first operating frequency band;

wherein the first radiating element includes a first dipole radiator having a first dipole arm and a second dipole arm and a second dipole radiator having a third dipole arm and a fourth dipole arm, and wherein the first dipole arm comprises a first metal region that substantially surrounds a non-metal interior region, and a shape of the non-metal interior region is configured to make the first metal region act as a frequency selective surface that conducts currents excited in response to RF energy in the first operating frequency band while cancelling currents excited in response to RF energy in the second operating frequency band, wherein the first non-metal interior region comprises a central opening and a plurality of auxiliary openings that extend radially outwardly from the central opening.

10. The antenna of claim 9, wherein the first and second of the plurality of auxiliary openings comprise respective first and second slots, and wherein a longitudinal axis of the first slot intersects a longitudinal axis of the second slot at an angle of 90°.

11. The antenna of claim 10, wherein the first radiating element is a dual polarized radiating element that is configured to transmit and receive RF energy at respective first and second orthogonal linear polarizations, and wherein the first slot extends in a direction of the first linear polarization and the second slot extends in a direction of the second linear polarization.

12. The antenna of claim 10, wherein the second dipole arm comprises a second metal region that substantially surrounds a second non-metal interior region, and the second non-metal interior region is configured so that currents induced on a first portion of the second metal region by RF energy emitted by the second radiating element substantially cancel currents induced on a second portion of the second metal region by the RF energy emitted by the second radiating element, wherein the second non-metal interior opening comprises third and fourth slots in the second metal region where metal is omitted, and wherein a longitudinal axis of the third slot intersects a longitudinal axis of the fourth slot at an angle of 90°.

13. The antenna of claim 12, wherein the first slot and the third slot are collinear, and the second slot and the fourth slot extend in parallel to each other.

14. The antenna of claim 9, wherein the plurality of auxiliary openings comprises a first slot that includes first and second segments that are collinear and that extend radially from the central opening and a second slot that includes third and fourth segments that are collinear and that extend radially from the central opening.

15. The antenna of claim 14, wherein the first through fourth segments define a cross shape.

16. The antenna of claim 9, wherein each of the first through fourth dipole arms has a substantially rectangular perimeter except for first and second recesses that are on respective first and second sides of the substantially rectangular perimeter.

17. An antenna, comprising:

a reflector;

a first radiating element extending forwardly from the reflector that is configured to operate in a first operating frequency band; and a second radiating element extending forwardly from the reflector that is configured to operate in a second operating frequency band that encompasses higher frequencies than the first operating frequency band;

wherein the first radiating element includes a first dipole radiator having a first dipole arm and a second dipole arm and a second dipole radiator having a third dipole arm and a fourth dipole arm, and wherein the first dipole arm comprises a first metal region that substantially surrounds a first non-metal interior region that comprises a central opening and first and second auxiliary openings that extend radially from the central opening.

18. The antenna of claim 17, wherein the first and second auxiliary openings comprise first and second collinear segments of a first slot that extends through the central opening.

19. The antenna of claim 18, wherein the central opening further includes third and fourth auxiliary openings that extend outwardly from the central opening, the third and fourth auxiliary openings comprising third and fourth collinear segments of a second slot that extends through the central opening, wherein the first slot intersects the second slot at an angle of 90°.

* * * * *